United States Patent [19]

Kyrias

[11] 3,927,152
[45] Dec. 16, 1975

[54] METHOD AND APPARATUS FOR BUBBLE SHEARING

[75] Inventor: Gilbert M. Kyrias, Littleton, Colo.

[73] Assignee: FMC Corporation, Chicago, Ill.

[22] Filed: Feb. 11, 1974

[21] Appl. No.: 441,573

Related U.S. Application Data

[63] Continuation-in-part of Ser. No. 123,693, March 12, 1971, abandoned.

[52] U.S. Cl. ......... 261/122; 261/124; 261/DIG. 75; 239/426
[51] Int. Cl.² ............................................ B01F 3/04
[58] Field of Search............ 261/124, DIG. 75, 122; 239/426

[56] References Cited
UNITED STATES PATENTS

| 1,677,265 | 7/1928 | Boving................................ | 261/124 |
| 2,081,382 | 5/1937 | Piatt................................... | 261/122 |
| 2,708,571 | 5/1955 | Fischerstrom et al. ............ | 261/124 |
| 2,719,032 | 9/1955 | Schnur.......................... | 261/DIG. 75 |
| 3,256,802 | 6/1966 | Karr.................................. | 261/122 |
| 3,397,871 | 8/1968 | Hasselberg................... | 261/DIG. 75 |
| 3,450,800 | 6/1969 | Smith et al................... | 261/DIG. 75 |
| 3,489,396 | 1/1970 | D'Aragon ......................... | 261/124 |
| 3,545,731 | 12/1970 | McManus .......................... | 261/122 |
| 3,671,022 | 6/1972 | Laird et al. ...................... | 261/124 |
| 3,829,068 | 8/1974 | Hohne .............................. | 261/124 |

FOREIGN PATENTS OR APPLICATIONS

| 694,918 | 7/1933 | United Kingdom................. | 261/122 |

*Primary Examiner*—Tim R. Miles
*Attorney, Agent, or Firm*—Dressler, Goldsmith, Clement & Gordon, Ltd.

[57] ABSTRACT

Method and apparatus for bubble shearing are disclosed in which nascent bubbles are formed by flowing gas through the very small capillary openings (no larger than about 100 microns in diameter) of a gas diffusing surface into a moving liquid that shears the nascent bubbles off as it moves past the capillary openings. In the apparatus, the gas diffusing surface forms one wall of a liquid transmitting slot through which the shearing liquid flows as it shears off fine gas bubbles.

127 Claims, 48 Drawing Figures

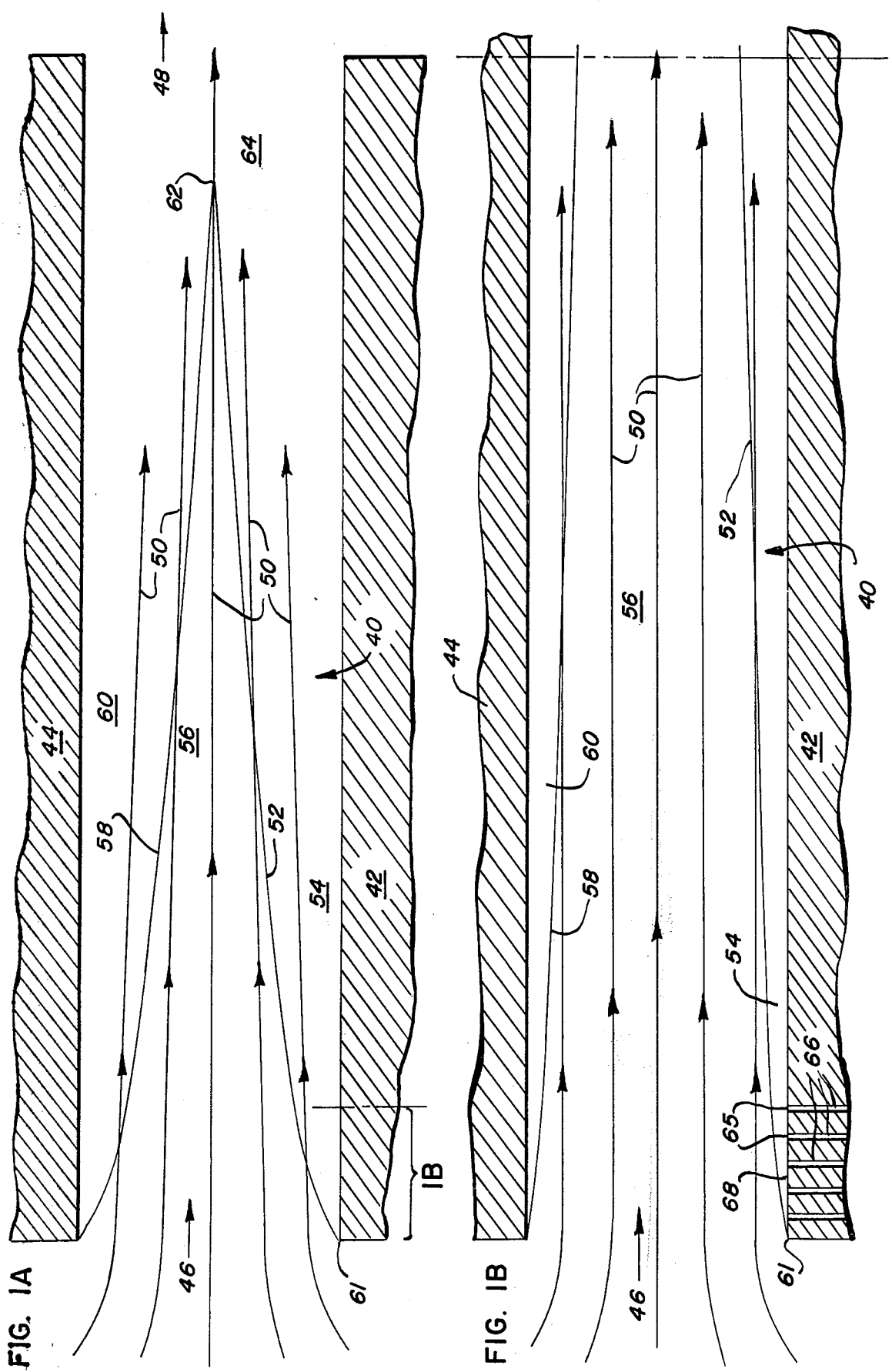

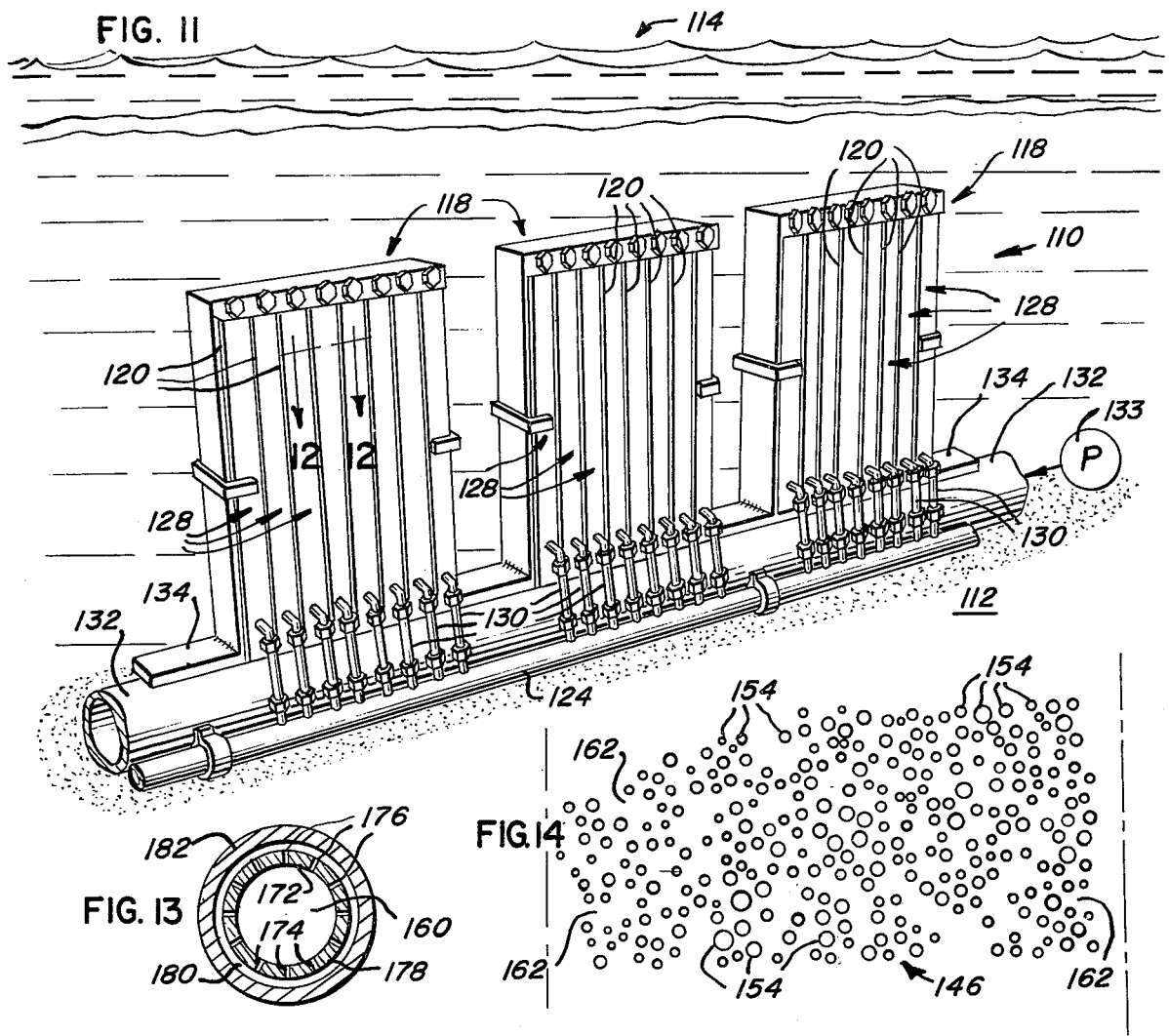
FIG. 11
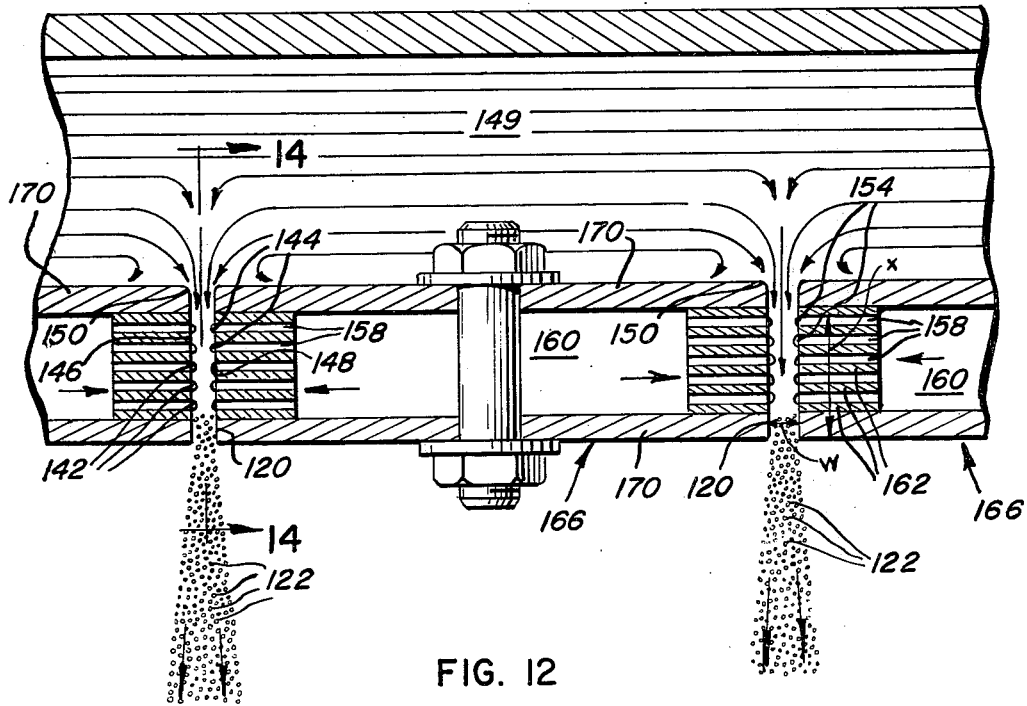
FIG. 12
FIG. 13
FIG. 14

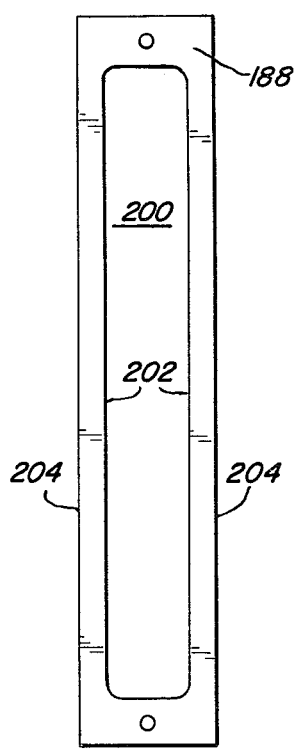 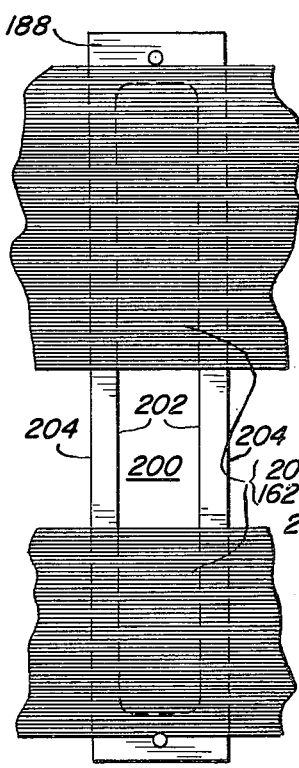 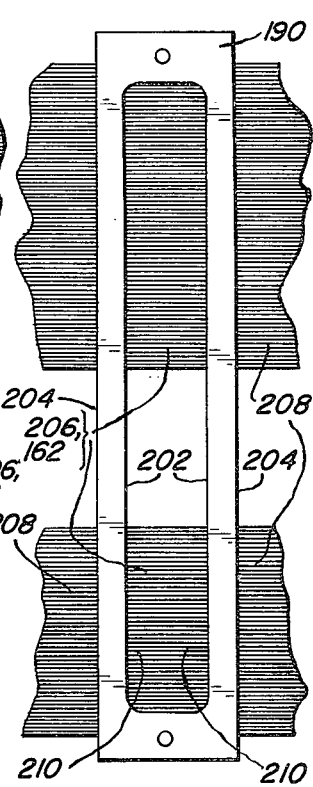 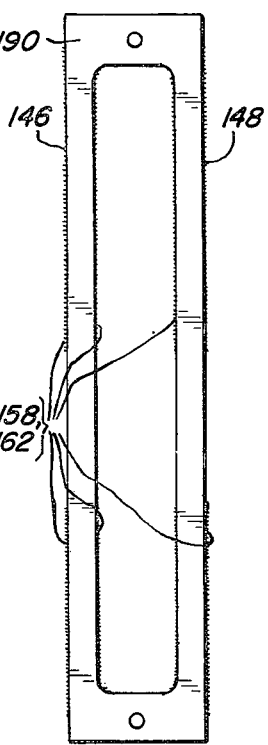
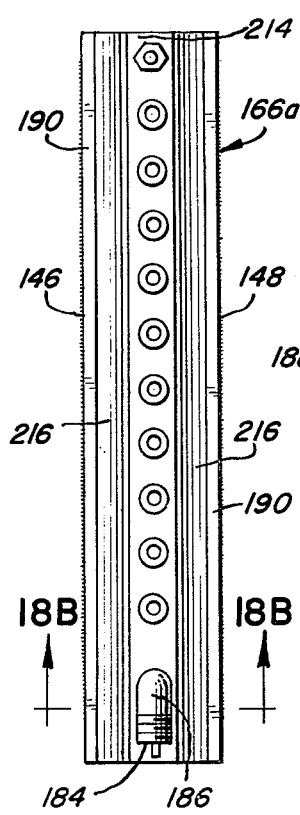 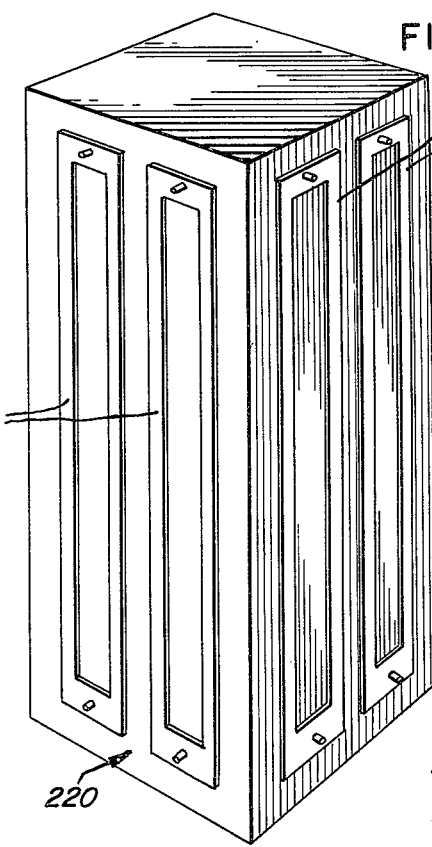 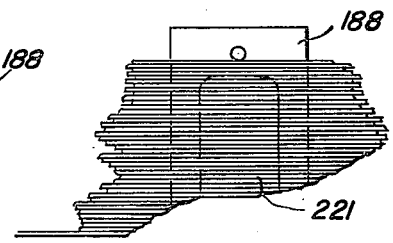  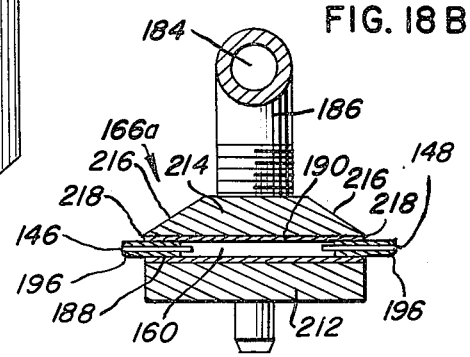

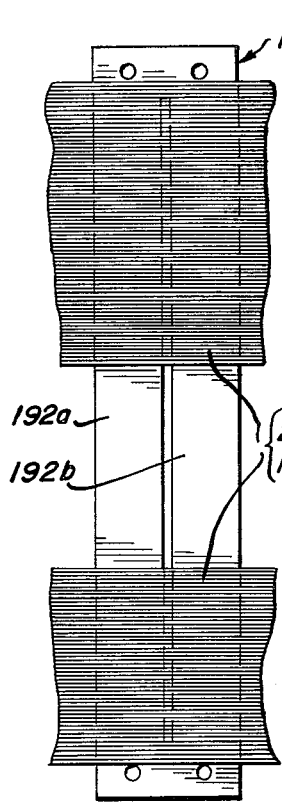
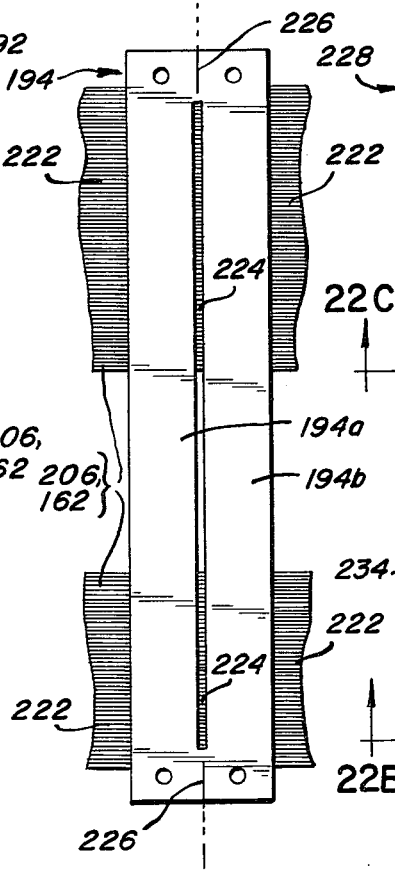
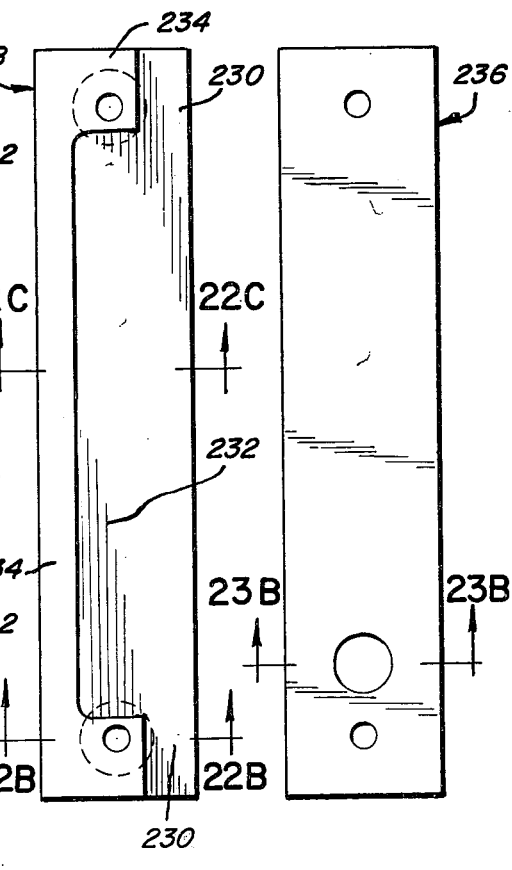
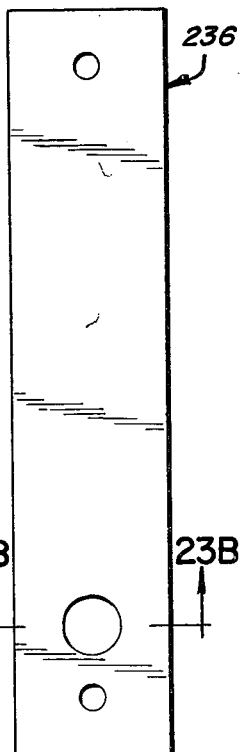
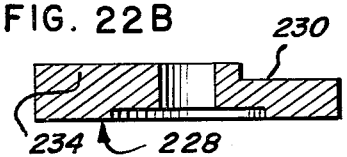
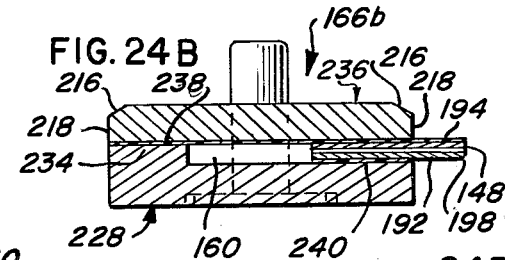
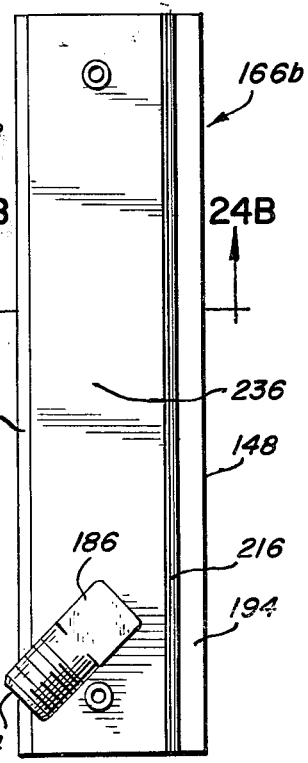
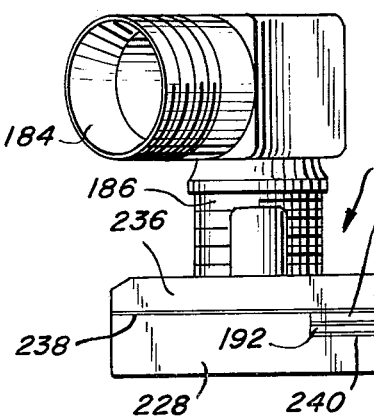
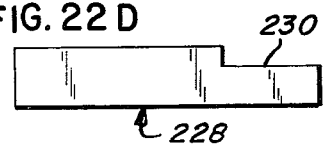
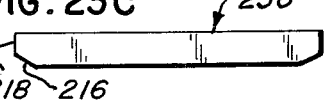

METHOD AND APPARATUS FOR BUBBLE SHEARING

This application is a continuation in part of my copending application entitled "Gas Diffuser," filed Mar. 12, 1971, and assigned Ser. No. 123,693, now abandoned.

This invention relates to apparatus and method for diffusing fine gas bubbles into a body of liquid.

BACKGROUND OF THE INVENTION

It is important in various processes to diffuse a gas into a body of liquid in a manner that will disperse the gas uniformly through a large portion of the liquid and result in as rapid as possible absorption of the gas by the liquid. Diffusion of a gas into a body of liquid in this way is useful, for example, in a large number of chemical and petrochemical processes. It is also important in certain sewage treatment processes. It is becoming increasingly important in the treatment of natural bodies of water with air, oxygen, or ozone in order to revive polluted rivers, lakes, bays, etc.

When, for purposes of economy or for any other reason, gases used in the treatment of a body of liquid should not be allowed to escape from the surface of the liquid, it is important that the method and apparatus used be such that all, or nearly all, the gas dissolves in the liquid before any substantial number of gas bubbles can rise to the surface. In every case, it is usually desirable that the absorption of the gas into the liquid proceed as rapidly as possible.

Effect of Bubble Size and Uniformity of Size

There are a number of factors that affect the rate at which a particular gas can be dissolved in a given body of liquid. Two of the most important of these factors are the size of the bubbles and the degree of uniformity in bubble size, which affect the rate of absorption of gas into the body of liquid as follows.

1. Smallest bubble size possible

One of the principal aims in any diffusion process in which the objective is rapid absorption of the gas in the liquid is to produce bubbles in as small a size as possible, because:

a. The smaller the bubbles, the slower they rise through the liquid, and thus the longer the period of time they have in which to be dissolved.

It is known that at a bubble size of about 200 microns, there is a marked increase in the rise rate of the bubbles through a body of water. Thus, the size of the bubbles to be dissolved in water should be less than this figure. Improved results are obtained with water if the maximum bubble diameter is no more than about 100 microns, and best results if substantially all the bubbles are no larger than about 50 microns in diameter.

b. The smaller the bubble, the larger is the surface that is available through which a given volume of gas can dissolve into the surrounding liquid. (To express the converse relationship: As bubbles grow larger, the surface of the bubble increases only as the square of the diameter, while the volume of gas in the bubble increases as the cube of the diameter.)

c. Because in smaller sized bubbles the surface undulations which tend to draw adjacent bubbles together are more heavily damped by viscous forces, such smaller sized bubbles are less likely to collide with other bubbles to coalesce to form new, larger bubbles.

d. For very small bubbles, the internal pressure of the bubble is markedly higher due to surface tension forces, and thus the driving force for transfer of the gas from the gaseous to the liquid phase is higher.

2. Highest possible degree of uniformity in bubble size

The ideal situation would be to have all the gas bubbles the same size when they are diffused into the body of liquid. When all bubbles are uniform in size, they will have a uniform terminal rise rate as they move upward through the body of liquid, which in turn means:

a. Local turbulence due to the so-called "chimney effect" — which would tend to disturb the uniformity of distribution of the gas bubbles through the body of liquid — will be avoided.

b. Since all the bubbles will be moving at a uniform rate, none will overtake other bubbles and tend to couple or coalesce with them. If two bubbles couple together with a kind of membrane between them, the overall surface through which a given volume of gas can dissolve into the surrounding liquid is reduced. If two bubbles coalesce to form a wholly new, larger bubble, the overall surface through which a given volume of gas can dissolve into the surrounding liquid is likewise reduced. In both cases, the result is further compounded by the fact that the new, larger bubbles will have an increased rise rate, and therefore will tend to overtake and join with still more bubbles.

Bubble Shearing

The ideal situation is to produce large numbers of very small bubbles, as nearly uniform in size as possible, at as high a rate as possible and with the lowest possible expenditure of energy. The present invention involves a novel and greatly improved "bubble shearing" method and apparatus by which this ideal situation is achieved.

It has long been known that method and apparatus employing the phenomenon known as bubble shearing are well adapted to the production of quite small gas bubbles in a liquid. In this method, a gas is passed through the capillary passages of a foraminous material to be introduced into a stream of liquid on the other side of the material. The gas emerges at the boundary surface of the foraminous material in a number of locations spaced from each other, where it starts to form a plurality of fine bubbles, or in other words forms "nascent" gas bubbles. The liquid into which the gas is thus introduced is caused to move more or less rapidly past the capillary openings of the foraminous material. As a result, the viscous shear forces exerted by the moving body of liquid shear off the partially formed or nascent gas bubbles before they can grow to such a size that their natural buoyancy in the liquid will cause them to break the surface tension that tends to hold them on the boundary surfaces of the gas transmitting foraminous material.

The novel and striking results from the use of the method and apparatus of the present bubble shearing invention are accomplished in ways that were previously either never considered, or were believed to be impossible, by those skilled in the art.

Disadvantages of the Prior Art

Probably the oldest method of introducing gas bubbles into a body of liquid is the method in which a gas transmitting body having a plurality of small openings is immersed in the liquid, and gas is caused to flow out of those openings into the liquid, to form bubbles that break away and rise in the liquid when they have grown to a large enough size that their buoyancy overcomes the surface tension that tends to hold them on the surface on which they form. The rate of formation of bubbles with this method is relatively low. Moreover, since each bubble must grow to such a size that its buoyancy is great enough to cause it to break away from the surface on which it is formed, these bubbles are of a larger size than is desirable for many applications. Examples of method and apparatus that rely solely or primarily on the buoyancy of the bubbles to break them away from the bubble forming surface include the Patents to Keen, No. 2,295,740, Nordell, No. 2,555,201, Fischerstrom et al., No. 2,708,571, and Schnur, No. 2,719,032.

Another method of diffusing bubbles into a body of liquid includes the flow of liquid past a plurality of openings (preferably oriented in the direction of downstream flow of the liquid) out of which gas is caused to flow by reason of the low pressure region in the wake of the moving liquid. The rate of formation of gas bubbles with this type of method and apparatus is only somewhat higher, and the median bubble size only somewhat smaller, than with the method and apparatus that rely primarily on the buoyancy of the bubbles to break them off the surface on which they are formed. Examples are disclosed in British Patent No. 942,754 and U.S. Pat. No. 3,489,396 to D'Aragon and No. 3,671,022 to Laird et al.

A more or less conventional form of bubble shearing apparatus is disclosed in Polish Patent No. 48,942. In that apparatus, a stream of liquid from an inlet pipe produces circulatory flow that moves past a cylindrical surface whose upper part is perforated to emit gas, and the turbulent moving liquid shears off gas bubbles that form at the perforations. Both the presence of turbulence and the large size of the perforations in the gas diffusing surface (estimated to be at least about 5 mm. in diameter) mean that the bubbles produced with the apparatus of this Polish patent cannot approach the small size of the bubbles produced by the method and apparatus of the present invention.

Apparatus that utilizes the bubble shearing principle in a special way is disclosed in Smith et al. Patent No. 3,450,800. In that patent, the free stream flow of a moving body of liquid shears off nascent bubbles at the openings of capillary tubes, and carries them downstream in the moving liquid. The discrete capillary openings are arranged in a free standing array of capillary tubes, which would obviously be subject to a high level of breakage from the moving shearing liquid. In addition, thousands of capillary tubes would be required to disperse fine bubbles in any significant quantity, which would so fill up the liquid transmitting passage as to make the apparatus impractical.

McManus Patent No. 3,545,731 points out that it has been conventional to impart a flow of relatively low velocity to a liquid medium in order to shear off bubbles from a foraminous gas transmitting surface on which the bubbles form, but McManus then rejects bubble shearing in favor of creating such a high liquid velocity flow that a turbulent boundary layer is formed in a region that is located virtually at the surface of the wall, with only a very thin laminar sublayer intervening between that region and the wall. As McManus explains, the pressure fluctuations in this turbulent region "snap off" the bubbles before they can be sheared off by viscous shear forces. The specification of the patent states that the bubbles thus formed are "of miscropic size, on the order of 5–10 microns in diameter," but no experimental evidence to support the statement (such as photomicrographs) is included in the patent. The major disadvantage of the McManus method and apparatus is that a liquid pressure head of 75 p.s.i. is required to create sufficient liquid flow to operate the apparatus; by contrast, the liquid pressure head required to operate the apparatus of the present invention is typically only about 2 to 7 p.s.i.

Several other prior art patents are addressed to the production of gas bubbles in moving streams of liquids under various conditions, but they do not give any hint of the desirability of establishing a partially developed laminar boundary layer in liquid flowing over capillary openings small enough to produce fine gas bubbles, which applicant has found to be a very important flow regime to establish. On the contrary, they actually disclose structural features that will produce either vena contracta (British Patent No. 1,039,702) or turbulence (Patents No. 2,695,710 to Gibbs and No. 3,256,802 to Karr, and British Patents Nos. 694,918, 713,064 and 885,406) when water moving at what applicant has found to be its minimum necessary velocity is used as the shearing liquid.

SUMMARY OF THIS INVENTION

This invention utilizes a gas diffusing surface having very small capillary openings, no larger than about 100 microns in diameter, preferably in close proximity to the leading edge of the surface. Shearing liquid is caused to flow past the leading edge of the gas diffusing surface to a discharge edge, to produce substantially parallel laminar flow, including a partially developed laminar boundary layer immediately adjacent the gas diffusing surface, with a free stream above that layer, over at least a substantial number of the capillary openings. In the method, the partially developed layer is present over at least about one-quarter of the capillary openings. The liquid over any additional capillary openings present in the gas diffusing surface downstream of the capillary openings already referred to must be substantially free of any type of flow (such as vena contracta or turbulence) other than fully developed substantially parallel laminar flow.

The term "capillary openings" is used herein to mean any openings small enough to produce fine gas bubbles, no matter what the nature of the gas diffusing surface is on which the bubbles are formed, or the nature of the gas transmitting passages through which gas flows to reach those openings.

The liquid in the partially developed laminar flow just described, either with or without the action of the free stream above the partially developed laminar boundary layer, shears nascent gas bubbles from the capillary openings. The moving liquid carries the fine gas bubbles thus produced away from the gas diffusing surface at its discharge edge, and into the body of liquid being treated. The partially developed laminar boundary layer may be transformed into fully developed laminar flow before the shearing liquid leaves the gas diffusing surface, and there may or may not be additional capillary openings beneath that fully developed flow. Some advantage may be derived from use of this invention even if some turbulence appears in the moving shearing liquid before it leaves the gas diffusing surface, but in that case there must be no capillary openings beneath the region of turbulence.

The bubble shearing apparatus of this invention includes a slot for transmitting shearing liquid past the capillary openings of the gas diffusing surface at which the nascent gas bubbles are formed before they are sheared off by the moving liquid. The shape, dimensions and spacing of the members defining the slot are adapted to establish laminar flow as described above when water is employed with the apparatus as the shearing liquid under certain specified operating conditions. In addition, the apparatus includes means for providing a flow of liquid in the slot at a velocity to produce such parallel laminar flow. It is best that the very small capillary openings in the gas diffusing surface be located in close proximity to the inlet end of the liquid transmitting slot, and preferably the farthest upstream of the capillary openings should lie immediately adjacent that inlet end, as close to the inlet as is structurally practicable.

The bubble shearing apparatus of this invention may be defined alternatively in terms of a figure of merit that is the product of (a) the distance separating the inlet end of the liquid transmitting slot from the very small capillary openings that lie farthest downstream on the gas diffusing surface over which the shearing liquid flows, times (b) the average width of the slot throughout the indicated distance. The units for this figure of merit are square inches. Satisfactory results may be obtained in some applications when the magnitude of this figure of merit is no more than about 0.1. Somewhat improved results are generally obtained when the figure of merit is no more than about 0.075, and still further improvement is obtained when it is no more than about 0.05. Very good results are obtained when the figure is no more than about 0.025, and excellent results when it is 0.01. For some applications, the preferred product of the indicated width and distance is no more than about 0.005 square inches, or even less.

This invention may also be defined in terms of the maximum distance from the leading edge of the gas diffusing surface to the most remote very small capillary openings in that surface. Values of 1 inch, 0.5 inch and 0.1 inch for this distance produce good, improved and preferred results, respectively. When distances of this order of magnitude have been used in prior art devices, it has only been with very large openings in the gas diffusing surface, such as the holes in British Patent No. 1,039,702, which are at least 400 times as large in area as the 100 micron or smaller diameter capillary openings of the present invention. It has been universally believed by those skilled in the art of bubble shearing that with capillary openings as small as are employed here, it is necessary to use a very much wider band of capillary openings than applicant has found to be required.

The present invention also includes a method of fabricating a gas transmitting body for use in the gas diffusion apparatus of the invention. This method includes the manufacturing of the foraminous portion of the wall of a gas plenum by embedding a plurality of hollow capillary strands, preferably as constitutent parts of a plurality of lengths of roving, in a matrix of hardenable binder, all contained between two plates to form a "sandwich" that is incorporated in one wall of the gas plenum.

BRIEF DESCRIPTION OF DRAWINGS

FIG. 1A is a gratly enlarged schematic cross sectional view of substantially parallel laminar flow of liquid from left to right through a slot, becoming fully developed laminar flow at the right-hand side of the figure;

FIG. 1B is a fragmentary view of the indicated portion of FIG. 1A, still further enlarged laterally and showing a plurality of capillary openings in close proximity to the leading edge of the slot;

FIG. 11 is an illustration of a diffuser assembly having a plurality of units or modules constructed in accordance with the present invention;

FIG. 12 is an enlarged fragmentary cross sectional view, schematic in nature, taken along the line 12—12 of FIG. 11, illustrating the relationship between gas dispersing assemblies or bars, a water supply chamber, and a plurality of discharge slots in one of the diffuser units;

FIG. 13 is a schematic cross sectional view of a gas transmitting body and a slot-defining member that are spaced to define an annular shearing liquid transmitting slot in another embodiment of the apparatus of this invention;

FIG. 14 is a drawing made from a photomicrograph giving a fragmentary view of an actual gas diffusing surface employed in apparatus according to this invention as seen from the position indicated by line 14—14 of FIG. 12;

FIGS. 17A through 17D show a succession of steps in the fabrication according to this invention of a gas transmitting body for use in the diffusion apparatus of the invention;

FIG. 18A is a plan view of a completed gas trasmitting body whose fabrication includes the steps illustrated in FIGS. 17A through 17D;

FIG. 18B is an enlarged sectional view taken along the line 18B—18B of FIG. 18A;

FIG. 19 is a perspective view of a winding fixture on which a plurality of the support plates of FIG. 17A have been secured for positioning a plurality of lengths of roving comprised of hollow capillary strands across said plates in accordance with this invention;

FIG. 20A is a fragmentary plan view of one of the support plates of FIG. 19 showing a plurality of rovings of hollow capillary strands in position across said plate;

FIG. 20B is a schematic cross sectional view taken through one of the rovings of FIG. 20A;

FIGS. 21A and 21B are plan views of steps in the fabrication of another sandwich of hollow capillary strands embedded in a matrix between two support plates that is incorporated in a gas transmitting body for use in the bubble shearing apparatus of this invention;

FIG. 22A is a plan view of the bottom cover plate of said gas transmitting body;

FIGS. 22B and 22C are cross sectional views taken along the lines 22B—22B and 22C—22C, respectively, of FIG. 22A;

FIG. 22D is an end view of the bottom cover plate of FIG. 22A;

FIG. 23A is a plan view of the top cover plate of said gas transmitting body;

FIG. 23B is a cross sectional view taken along the line 23B—23B of FIG. 23A;

FIG. 23C is an end view of the top cover plate of FIG. 23A;

FIG. 24A is a plan view of an assembled gas transmitting body made according to this form of the method of fabrication of such a body for use in the apparatus of this invention;

FIG. 24B is an enlarged cross sectional view taken along the line 24B—24B of FIG. 24A; and FIG. 24C is a similarly enlarged end view of the assembled gas transmitting body of FIG. 24A.

FURTHER DESCRIPTION OF THE INVENTION

Figure 2A:
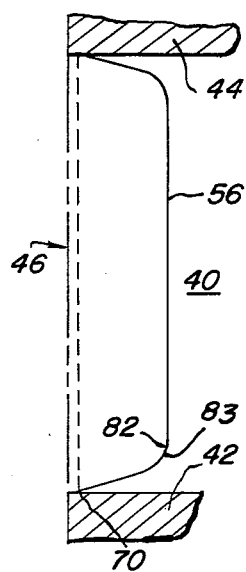
FIGS. 2A through 2F are graphs of the velocity distribution for laminar flow of shearing liquid through a liquid transmitting slot, at positions located progressively downstream from the inlet end of the slot.
Figure 2B:
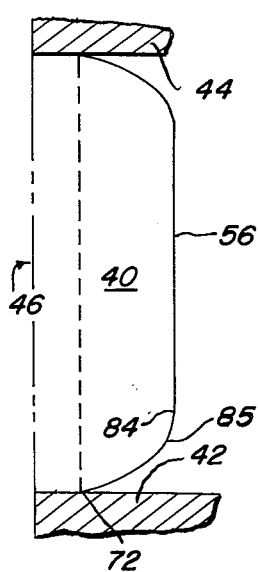
Figure 2C:
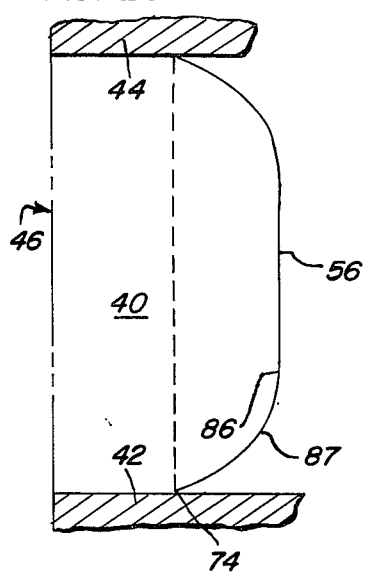
Figure 2D:
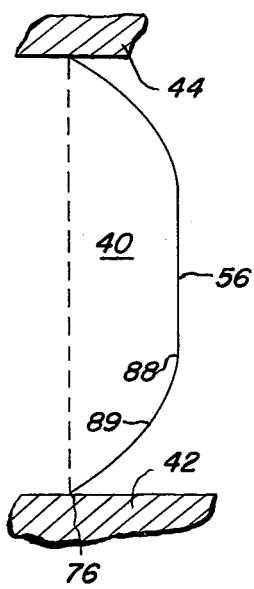
Figure 2E:
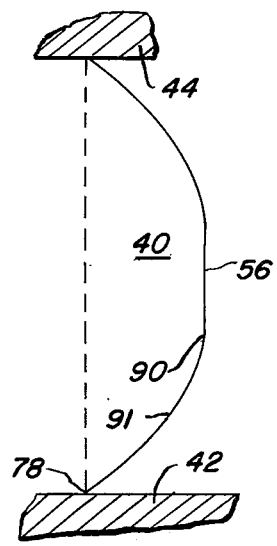
Figure 2F:
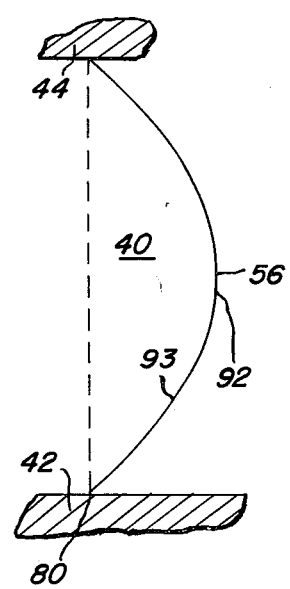

Contrary to the teaching of the prior art, applicant has discovered that in producing fine gas bubbles by flowing liquid over very small capillary openings in a gas diffusing surface, it is important to avoid all turbulence or vena contracta in the moving liquid but at the same time to establish and maintain no more than partially developed laminar flow over a significant portion of the capillary openings of the gas diffusing surface. The importance of positioning all the small capillary openings in close proximity to the leading edge of the surface on which the bubbles are formed is likewise not taught in the prior art. With the novel method and apparatus based on these discoveries by applicant, it has been found that bubbles of very small diameter and very good uniformity of bubble size can be formed with a surprisingly low expenditure of energy.

Substantially Parallel Laminar Flow

As just indicated, the aim in the method and apparatus of the present invention, contrary to the teaching of the prior art, is to achieve a steady but rapid liquid flow, with only minimal perturbations, past the very small capillary openings at which bubble formation takes place. A specific objective of the invention is to produce a partially developed laminar boundary layer over a substantial number — in the method of this application, at least about one-quarter — of the capillary openings in the gas diffusing surface.

FIG. 1A gives a schematic representation of substantially parallel laminar flow through slot 40 (which is formed by substantiall planar, parallel walls 42 and 44) from inlet end 46 to discharge end 48 of the slot. Slot 40 is shown as being long enough that, as will be explained below, the substantially parallel laminar flow through the slot becomes fully developed. The scale of the figure is greatly exaggerated for clarity, and thus slot 40 should not be thought of as being nearly as large as the expanded scale of FIG. 1A might suggest. In one actual embodiment of the apparatus of this invention, for example, the width of slot 40 is only about 0.040 inches and the slot length only about 0.080 inches.

Streamlines 50 show the direction of movement of the liquid from left to right through slot 40. As will be seen, the movement is substantially parallel to the respective contours of walls 42 and 44 which form the slot. There is no vena contracta flow, which would include one or more zones in which the liquid would circulate in closed paths and thus be prevented from flowing continuously through the available channel of slot 40. There is also no turbulent flow through the slot, which would include extreme perturbations resulting in great variations in liquid pressure within the region of turbulence.

In laminar flow, the liquid moves as if it were in layers with different velocities. This is illustrated in FIG. 1A by interface 52 between laminar boundary layer 54 and free stream 56 at the bottom of slot 40, and interface 58 between laminar boundary layer 60 and free stream 56 at the top of slot 40. The existence of these two interfaces can be verified by techniques known to those skilled in hydrodynamics.

Partially Developed Laminar Boundary Layer

In the flow illustrated in FIG. 1A, the velocity of the liquid at inlet end 46 of slot 40 is uniform across the width of the slot. Because of viscous friction between the liquid and walls 42 and 44, the moving liquid immediately adjacent those walls is slowed down markedly as it passes through slot 40. This in turn reduces the velocity of the liquid at greater distances from walls 42 and 44. The result is that a laminar boundary layer forms on each wall, with the velocity of the moving liquid in the layer ranging from its lowest value at the wall to its maximum value where it joins the free stream flow at the outer portions of the layer.

As shown in FIG. 1A, laminar boundary layers 54 and 60 increase in thickness from zero at leading edge 61 of the surface of wall 42, until they merge at point 62 near the end of slot 40. Laminar boundary layers 54 and 60 are characterized as "partially developed laminar boundary layers" from inlet 46 of slot 40 to point 62. "Fully developed laminar flow" 64 continues from point 62 to discharge end 48 of slot 40.

FIG. 1B is a laterally expanded view of the indicated fragment from the left-hand side of FIG. 1A, with capillary openings 65 added to the drawing in schematic form. Gas passages 66 extend through wall 42, and terminate in capillary openings 65 in close proximity to leading edge 61 at inlet end 46 of slot 40, to form gas diffusing surface 68.

Partially developed laminar boundary layer 54, in contact with slot wall 42, is seen slowly building up in thickness from leading edge 61, and partially developed laminar boundary layer 60 is seen building up in a similar way in contact with upper wall 44. As in FIG. 1A, free stream 56 lies between the partially developed laminar boundary layers with interface 52 separating them in the lower part of slot 40 and interface 58 separating them in the upper part of slot 40. Streamlines 50 again represent the flow of liquid from left to right through the slot. With the expanded scale of FIG. 1B, it is seen that partially developed laminar boundary layer 54 is relatively thin above the capillary openings shown in that figure.

As already pointed out above, in an actual embodiment of the apparatus of this invention, the dimensions of slot 40 are very much smaller than is suggested by the expanded scales of FIGS. 1A and 1B. In that particular actual embodiment, however, the capillary openings are located somewhat farther downstream from the leading edge of the gas diffusing surface than is suggested in FIG. 1B, although still in close proximity thereto.

Free Stream Velocity

For reasons already explained, the liquid in the portions of laminar boundary layers 54 and 60 in contact with their respective walls 42 and 44 moves more slowly than the liquid entering inlet end 46 of slot 40. Since the quantity of liquid that leaves slot 40 at its discharge end 48 must be the same as that entering at inlet end 46, the liquid in free stream 56 must compensate for this slowdown by moving more rapidly than the liquid entering slot 40. As the retarding effect of the viscous friction between the walls and the moving liquid is felt by a thicker and thicker layer of liquid as one moves downstream, the free stream velocity balances this effect by continuing to increase as the liquid flows through the slot, until the velocity reaches a limiting maximum value at some point downstream.

Figure 9:
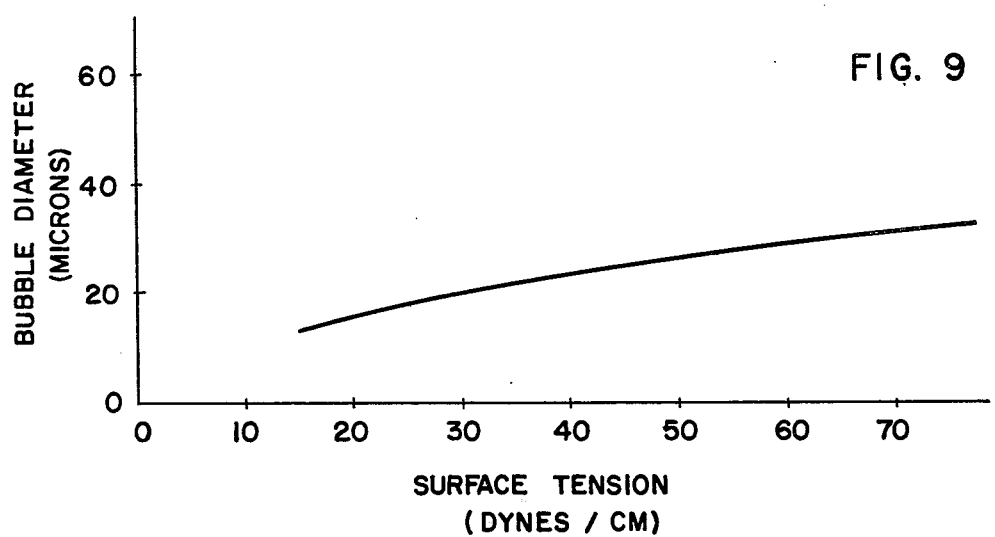

FIGS. 2A through 2F, which are derived from Figure 9.16 of Schlichting, *Boundary-Layer Theory*, Sixth Ed. (McGraw-Hill, 1968), page 177, illustrate how the velocity profile of the liquid flow through slot 40 changes as one moves downstream through the slot. In these figures, fragments of walls 42 and 44 are shown as defining successive portions of slot 40. The successive stations shown in these figures proceed downstream from inlet 46 in FIG. 2A to a location in FIG. 2F where the velocity profile is approaching a parabolic form. At stations still farther downstream, the velocity profile assumes the form of a parabola, and the flow has become similar to the fully developed flow indicated at 62 in FIG. 1A.

The successive stations in FIGS. 2A through 2F are located at 0.1, 0.4, 1.0, 2.0, 4 and 10 units of distance downstream from inlet 46, at points 70, 72, 74, 76, 78 and 80, respectively. The distances from the slot wall are measured in the vertical direction. The velocity of the moving liquid at the indicated distances from the wall is represented by the displacement of the points of the graph to the right in the horizontal direction. Thus, as will be seen, the liquid moves with a velocity increasing from zero at walls 42 and 44 to a maximum — substantially uniform — velocity across free stream 56.

Figure 3:
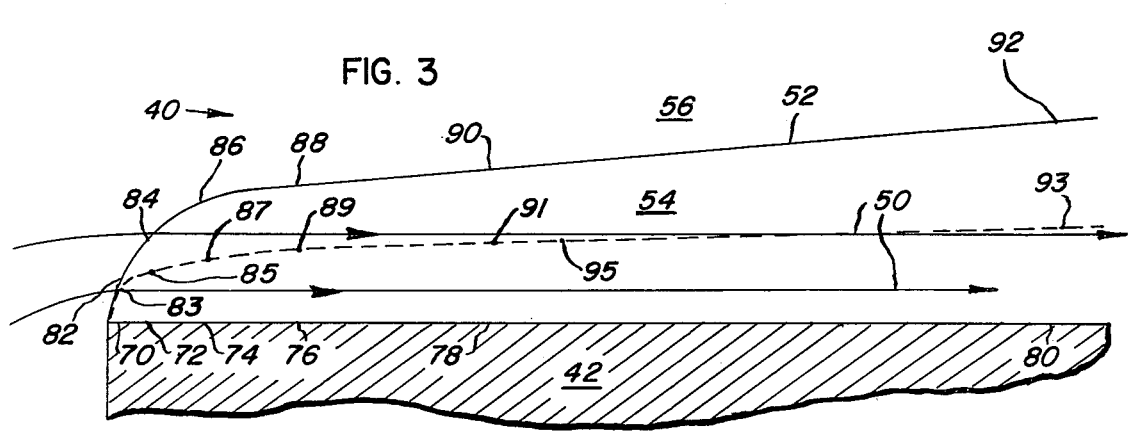
FIG. 3 is a fragmentary schematic drawing of the laminar flow of shearing liquid represented by FIGS. 2A through 2F, showing only the bottom wall of the slot.

Points 82, 84, 86, 88, 90 and 92 represent the distances from slot wall 42 at which liquid is moving with substantially the same velocity as the free stream velocity (which increases with increasing distances downstream) at points 70, 72, 74, 76, 78 and 80, respectively. In FIGS. 1A or 1B, in other words, points 82 through 92 would fall on interface 52 which defines laminar boundary layer 54. These points derived from FIGS. 2A through 2F have also been plotted in FIG. 3.

At the same time that viscous friction with the slot wall slows down the moving liquid in the lower portions of laminar boundary layer 54, the liquid in the upper portions of laminar boundary layer 54 speeds up to keep pace with the increasing velocity of free stream 56. Points 83, 85, 87, 89, 91 and 93 represent the distances from slot wall 42 at which liquid moves with substantially the same velocity with which it entered slot 40 at inlet end 46. These points are plotted as dashed line 95 in FIG. 3. Above line 95, liquid moves more rapidly than it did when it entered slot 40, while below line 95 it moves more slowly.

The viscous shearing force exerted by any moving liquid is directly proportional to the velocity with which the liquid is moving. Thus, a nascent gas bubble that forms at a capillary opening in slot wall 42 below layer 54 will not extend very far above the more slowly moving liquid in the bottom portions of laminar boundary layer 54 — and certainly not far into free stream 56 above the top portion of the laminar boundary layer — before it will be sheared off. This is what keeps the diameter of the gas bubbles produced by use of this invention small.

Hydrodynamic Requirements Of This Invention

Two requirements must be met when the method and apparatus of this invention are defined hydrodynamically:

1. A partially developed laminar boundary layer is established above a substantial number — in the method, at least about the first one-quarter measured from the leading edge of the gas diffusing surface — of the capillary openings in the gas diffusing surface at which bubbles are formed and sheared off.

2. The liquid over all capillary openings that are present in the gas diffusing surface is substantially free of any type of flow other than partially or fully developed substantially parallel laminar flow.

These two requirements must be met no matter what shearing liquid is used in the method of this invention. In defining the apparatus, however, a specific shearing liquid and specific test conditions are employed, as discussed further below.

It is now required that the laminar flow be absolutely parallel, but only substantially so. Likewise, it is not required that the liquid over all the capillary openings in the gas diffusing surface be absolutely free of any type of flow other than the desired flow, but only substantially free. As one skilled in the art will recognize, residual minimal perturbations will almost always be present in the shearing liquid because of its history prior to entering the liquid transmitting slot. Likewise, there will almost always be minimal perturbations present along the walls of the shearing liquid transmitting slot. The very presence of the nascent gas bubbles and the shearing of those bubbles will also produce (see FIG. 4A below) minor departures from truly straight streamlines. In fact, the main streamlines themselves will not be wholly parallel (FIG. 1A) until they reach the region of fully developed laminar flow some distance downstream from the inlete end of the liquid transmitting slot. The skilled worker will understand, however, that none of these minor variations from absolutely parallel streamlines will be detrimental, and that substantial freedom from unstable flow such as turbulence or vena contracta will be sufficient for the method and apparatus of this invention.

The presence of absence of the two hydrodynamic features listed above in the operation of any particular method and apparatus is readily ascertainable by those skilled in the art when the shearing liquid is transparent, or at least translucent. In such systems the presence or absence of the defined laminar flow may be determined visually after release of a small amount of dye into the stream within the slot, or may be seen from photomicrographs which show alignments or "strings" of tiny bubbles running in the direction of the laminar flow, presumably from particular individual capillary openings.

With opaque liquids, such as sewage, the presence or absence of substantially parallel laminar flow including a partially developed laminar boundary layer is more difficult to determine, but techniques for making such a determination with some degree of reliability are known. In any event, this determination can be made, as a practical matter, by analogy to test flow under similar conditions with transparent or translucent shearing liquids. A particular method or apparatus may be tested, for example, by operation with a synthetic transparent or translucent sewage fluid comprising an aqueous solution containing a sufficient amount of a thickener, such as carboxymethylcellulose, to provide a viscosity similar to that of the sewage being treated, and by the observance of the flow in such a liquid by dye, or by bubbles, as described above.

Alternatively, one skilled in the art may, as a practical matter, test a given apparatus with a readily available test liquid, such as water, to determine whether or not the defined laminar flow will prevail when the apparatus is utilized with a second liquid such as sewage. This may be important either because the liquid with which a particular piece of apparatus is designed to be used is opaque, or because it is not known for sure with what liquid the apparatus will be used.

Demonstrating Laminar Flow, Including Partially Developed Laminar Boundary Layer, In One Liquid By Testing Another It is well known that laminar flow exists in any system in which the Reynolds number is below a specified critical level. In a flow system of given channel geometry and surface characteristics, the Reynolds number is directly proportional to the linear velocity of liquid flow and to the fluid density, and is inversely proportional to the fluid viscosity. The fluid densities of liquids of high water content are substantially identical and may, as a practical matter, be ignored; so that the threshold velocity for conversion of laminar to turbulent flow in any designated apparatus is directly proportional to the viscosity of liquid passing therethrough.

Utilizing this information, one skilled in the art can test a given apparatus with water at 20°C., for example, to ascertain whether the apparatus would be suitable for use with another liquid which has a higher viscosity, such as sewage. An apparatus which provides laminar flow when water at 20°C is passed through the slot at a given linear velocity will also provide laminar flow, including a partially developed laminar boundary layer, when sewage is passed through the same slot at that velocity because sewage has a higher viscosity and therefore a higher threshhold velocity for the beginning of turbulent flow.

On the other hand, a velocity which will produce turbulent flow with water in a given apparatus will not necessariily produce turbulent flow with sewage, because of the higher viscosity of the latter. For this reason, the test velocity at which water is passed through the slot of the apparatus in testing its suitability for use in the treatment of sewage may be a lower velocity than is to be used in the operation of the apparatus with sewage. For example, the apparatus may be tested to determine whether or not the defined laminar flow prevails when water at 20°C. is passed through the slot at a mean entrance velocity of 10 feet per second. If laminar flow exists with water in a given apparatus at this flow rate, one skilled in the art can be assured, as a practical matter, that sewage containing about 1 per cent of suspended solids or about 6 per cent of suspended solids (both common forms of sewage) can pass through the same slot, while still maintaining laminar flow, including a partially developed laminar boundary layer, at velocities far above this figure, and in fact well above any practical level at which the apparatus of this invention would conceivably be used.

Accordingly, one way of defining the apparatus of this invention is to prescribe a specific test, involving the use of water flowing at a stated minimum velocity, that the particular construction must meet. The test prescribed in the claims below is that the shape, dimensions and spacing of the gas transmitting body and the slot-defining member lying on both sides of the shearing liquid transmitting slot must be adapted, when water at 20°C. is flowing through the liquid transmitting slot with a mean entrance velocity of 10 feet per second and no gas is flowing through said gas transmitting passages, to establish the defined substantially parallel laminar flow. Higher shearing liquid velocities are also specified in the claims. The particular velocities specified have been found to be essential for efficient small bubble formation with water as the shearing liquid, and these results are nowhere disclosed in the prior art known to applicant.

Apparatus that meets the test described falls within the scope of the claimed apparatus invention, whether in its ultimate practical application it is used with water or with some other liquid as the shearing liquid. The validity of this method of definition of the apparatus of the present invention is supported by the "extrapolation," as it were, from one liquid (water) to a second, more viscous liquid (such as 6 per cent suspended solids sewage) in the manner that has been described above, to demonstrate that the defined laminar flow is present if the second liquid is employed, just as it is when the first liquid is used as the shearing liquid.

It has been found that the two hydrodynamic requirements that are characteristic of the apparatus of this invention are present, and satisfactory results in terms of bubble size and uniformity of bubble size will be produced, when the average test velocity across the inlet end of a slot of typical width, with water at 20°C. used as the shearing liquid, is 10 feet per second. Improved bubble shearing can be achieved with apparatus that produces the defined laminar flow when this test velocity is 15 feet per second, and still further improvement when the test velocity is 20 or 25 feet per second.

The same technique of proof by extrapolation may be used, if it is necessary to do so, to show that a particular bubble shearing method comes within the scope of this invention.

The presence or absence of the defined laminar flow in any given system may if desired by corroborated by secondary evidence, such as the efficiency of the gas absorption process resulting from use of the system. It has been found that for a given volume of gas introduced within a given time into a given volume of liquid, absorption is substantially more complete when the above described two hydrodynamic conditions are present in the method and apparatus by which gas bubbles are formed. The converse is also true: The existence of these two conditions may be corroborated by demonstrating the greater effectiveness of the given system in comparison to the effectiveness which is obtained when the flow conditions through the slot are clearly turbulent flow conditions.

Gas Flow Rate

It is important in the method and apparatus of this invention not only that the two essential hydrodynamic requirements be present but also that the gas flow rate into the shearing liquid be sufficiently high. With too little gas flow, the volume of gas diffused into the liquid in a given period of time may be so small that even though the bubbles produced are of a desirable size and uniformity, the output of the apparatus is impractically inefficient and the necessary equipment for a given application prohibitively expensive.

The maintenance of desirably high gas flow rates may, however, tend to militate against the establishment of the two essential hydrodynamic characteristics of this invention. If the gas flow rate reaches too high a level, it will be impossible to establish the necessary parallel laminar flow and to avoid undesirable types of flow such as vena contracta or turbulence above the capillary openings in the gas diffusing surface. The particular gas flow rate that is desirable for a given apparatus and for a given set of operating conditions can best be determined empirically by one skilled in the art, keeping in mind all the many factors that affect bubble shearing.

In resolution of these conflicting objectives of high gas flow rate and substantially parallel laminar flow as described, it has been determined that with typical shape, dimensions and spacing for the members defining the shearing liquid transmitting slot of the apparatus of this invention, and water as the shearing liquid, the gas flow rate should be at least about 5 to 10 standard cubic feet per minute per square foot of active area in the gas diffusing surface. As a practical matter, this rate of oxygen flow employed with a water flow velocity of 20 feet per second and a water volumetric flow rate of 2.5 gallons per minute per inch of slot inlet length will produce a transfer of oxygen into water of about 0.5 to 1 lb./HP/hr., an oxygen transfer rate that is characteristic of a number of sewage treatment installations. Improved results are obtained if this gas flow figure for water as the test liquid is about 40 scfm, and still better results if it is about 70 scfm.

The term "active area" is used in this specification and claims to refer to the area defined by lines tangent to the outermost capillary openings at which bubbles are formed.

Conventional Precautions To Achieve Substantially Parallel Laminar Flow

It is also important in the practice of this invention to take as many reasonable precautions — in view of the width of the liquid transmitting slot, the length of flow through the slot, and the viscosity and flow velocity of the shearing liquid with which the apparatus is designed to be operated — as are necessary to avoid turbulence or vena contracta and achieve substantially parallel laminar flow in the slot.

With water flowing at a velocity of at least about 10 feet per second as the shearing liquid, for example, one skilled in the art will understand that if the length of flow through the liquid transmitting slot is more than about one-half inch, some attention must be paid to taking reasonable precautions to avoid the establishment of turbulent flow in the slot. The necessity to take care to avoid vena contracta increases when the liquid flow path is quite short. On the other hand, it is well known that greater care must be taken to avoid turbulence, the wider the liquid transmitting slot or the longer the liquid flow path through the slot. Increased care must also be taken when lower viscosity shearing liquids or higher shearing liquid flow velocities are employed.

Conventional precautions against the occurrence of vena contracta include, in addition to avoiding too short a flow path, avoiding openings of too large size through which gas is introduced into the shearing liquid, and, most important of all, employing rounded edges at the slot inlet. Conventional precautions against the occurrence of turbulence include utilizing contoured inlets, avoiding anything more than minimal protuberances, avoiding rough channel walls, exercising special control of liquid flow into the inlet to minimize the initial level of perturbations, etc.

The roughness of the channel walls may be expressed in terms of (1) the height of the most prominent peaks and the depth of the lowest depressions, respectively, above and below the median plane of the channel wall, compared to (2) the displacement thickness of the laminar boundary layer in the liquid flowing along the wall. To minimize the tendency for the liquid flow to go turbulent, the former dimensions should ordinarily be only a small fraction of the latter.

Conventional measures to control the liquid flow into the slot inlet in order to minimize the level of perturbations at that point include the use of a quieting reservoir to dissipate any turbulence already present, avoiding abrupt corners in the feed line leading to the slot inlet, using turning vanes whenever turns are unavoidable, avoiding steps in the flow path, avoiding orifices in the flow path, using pumps and valves only when absolutely necessary, and similar measures designed to produce as quiet a flow condition as possible.

Examples of Parallel Laminar Flow Covered By This Invention

Best results are achieved with the method and apparatus of this invention when these additional conditions obtain:

The partially developed laminar boundary layer extends along the entire length of the gas diffusing surface — even those portions where there are no capillary openings — over which the shearing liquid flows; and All the nascent gas bubbles are sheared from the gas diffusing surface by the combined action of the liquid moving in the partially developed laminar boundary layer and the liquid moving in the free stream above that layer.

Figure 4A:
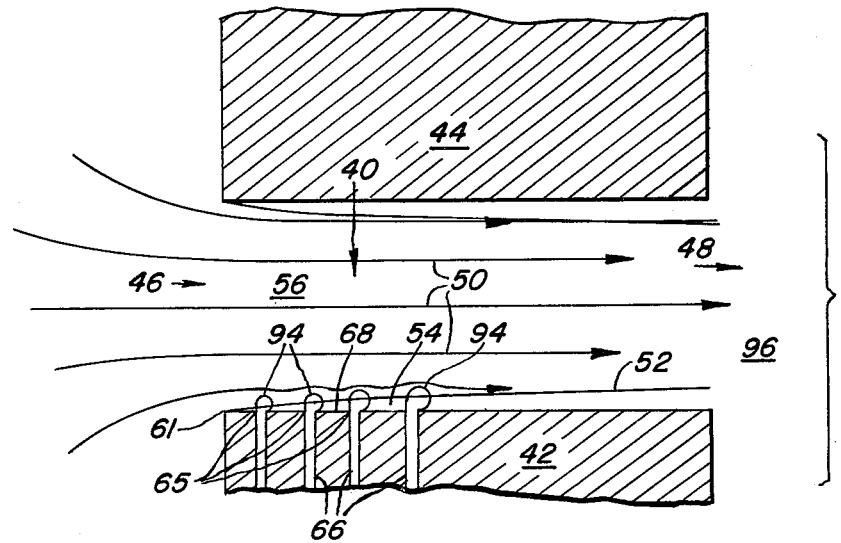
FIGS. 4A through FIG. 4F are schematic cross sectional views of various types of substantially parallel laminar flow of shearing liquid through a liquid transmitting slot, produced by the use of the method and apparatus of this invention.

These particular conditions are illustrated schematically in FIG. 4A, which represents a preferred form of this invention. This figure, like FIGS. 1A and 1B above and FIGS. 4B through 4F below, is greatly enlarged for clarity. In an actual embodiment of the apparatus of this invention, the width of slot 40 is about 0.040 inches, and the length about 0.080 inches. The capillary openings in that embodiment are much smaller and more numerous than are shown schematically in FIG. 4A, although not located so close to leading edge 61.

Wall 42 is a gas transmitting body having a plurality of gas transmitting passages 66 extending therethrough, each of which terminates in a capillary opening 65 at gas diffusing surface 68 of the wall. The apparatus includes means for providing a flow of gas through gas transmitting passages 66 and out capillary openings 65 to form nascent gas bubbles 94.

Wall 44, spaced from gas diffusing surface 68, defines slot 40, which has an inlet end 46 and a discharge end 48. The body of liquid 96 into which the fine bubbles produced by the use of this invention are diffused lies to the right of slot 40 in FIG. 4A.

Laminar flow substantially parallel to the contour of gas diffusing surface 68 is established in the liquid flowing through slot 40. Because capillary openings 65 are located in close proximity to leading edge 61 at inlet end 46 of slot 40, they lie beneath partially developed laminar boundary layer 54. Free stream 56 is established above laminar boundary layer 54 over the capillary openings. As in the earlier figures, streamlines 50 illustrate the substantially parallel laminar flow from left to right.

The shape, dimensions and spacing of gas transmitting body 42 and slot defining member 44 are adapted, when water is employed as the shearing liquid under the conditions specified above, to establish laminar flow of the kind described above in the water that flows through slot 40. In addition, the apparatus includes means for providing a flow of liquid through slot 40 at a velocity that will produce in water that type of substantially parallel laminar flow.

The result of use of this apparatus is to shear nascent gas bubbles 94 from capillary openings 65, so that the flow of liquid through slot 40 carries the sheared gas bubbles out of the slot at its discharge end 48 and into the body of liquid 96. As is shown in FIG. 4A, all bubbles sheared in this preferred embodiment of the apparatus of the invention are sheared from capillary openings 65 by the combined action of the liquid moving in partially developed laminar boundary layer 54 and the liquid moving in free stream 56 above the boundary layer. The surface tension at the juncture between the surface of the gas bubble and gas diffusing surface 68 surrounding each capillary opening 65 tends to cause each bubble to adhere to surface 68. However, the movement of liquid from left to right through slot 40 in FIG. 4A shears the nascent gas bubbles off surface 68 against the force of the surface tension referred to, and in this manner produces gas bubbles of very much smaller diameter than would be formed if it was the buoyancy of the bubble as it reached its full growth that broke the surface tension holding the bubble to the gas diffusing surface.

Since capillary openings 65 are in close proximity to leading edge 61, partially developed laminar boundary layer 54 has little time in which to build up into a thick layer. When the nascent bubbles 94 protrude above interface 52 between laminar boundary layer 54 and free stream 56, they are exposed to the full force of free stream 56, which is moving with greater velocity than the liquid in laminar boundary layer 54. For this reason, the nascent gas bubbles are sheared off before they can grow to any very large diameter. As an example, the method and apparatus of this invention have been used to produce bubbles of air in water some of which are as small as 10 microns in diameter, with the median diameter being no more than about 25 to 30 microns. As illustrated schematically in FIG. 4A, the gas bubbles grow slightly larger as one proceeds downstream and the partially developed laminar boundary layer increases in thickness.

As is seen from FIG. 4A, partially developed laminar boundary layer 54, with free stream 56 above it, extends beyond all capillary openings 65 in gas diffusing surface 68 to discharge end 48 of slot 40, and free stream 56 extends still farther, into body of liquid 96. The same is true of the embodiments of the apparatus of this invention illustrated in FIGS. 4B and 4C, where the same designator numerals are employed for the various elements as in FIGS. 1A, 1B and 4A.

Figure 4B:
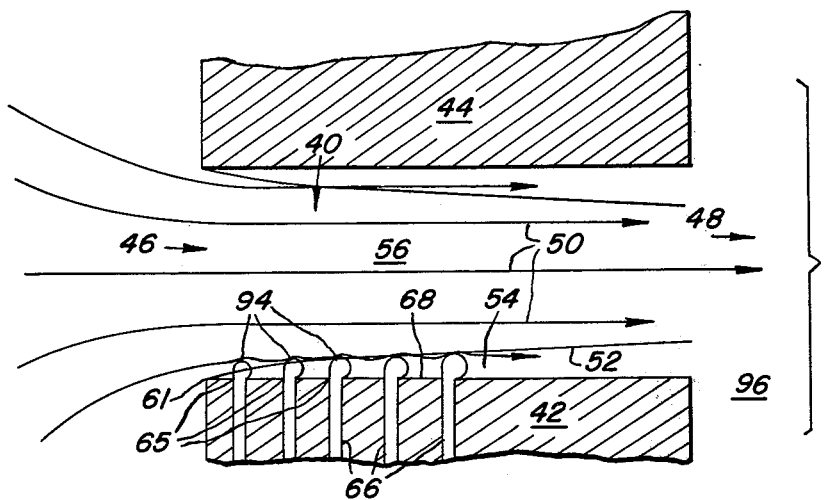

The bubble shearing achieved by the apparatus illustrated schematically in FIG. 4B is only slightly less effective than the bubble shearing achieved by the apparatus of FIG. 4A. In the apparatus of FIG. 4B only some, but not all, of nascent gas bubbles 94 are sheared from capillary openings 65 in gas diffusing surface 68 by the combined action of the liquid moving in partially developed laminar boundary layer 54 and the liquid moving in free stream 56. The remainder of nascent bubbles 94 are sheared from capillaries 65 solely by the action of the liquid moving in laminar boundary layer 54.

Figure 4C:
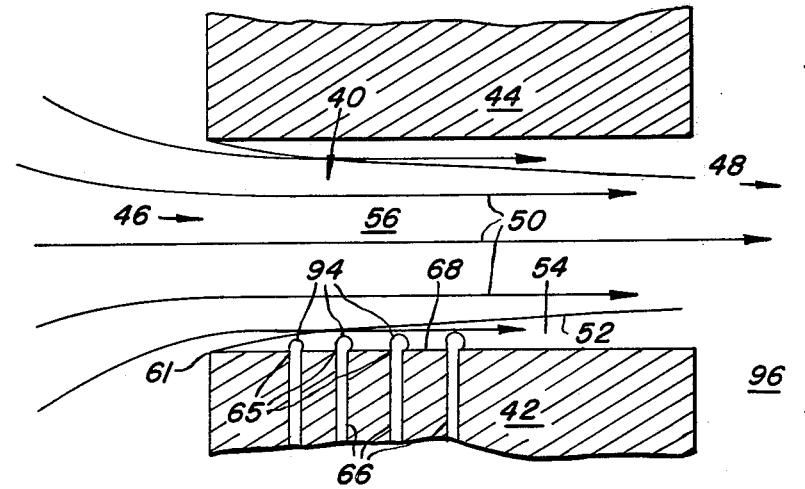

Because laminar boundary layer 54 is very thin, the embodiment of the apparatus of this invention shown schematically in FIG. 4C likewise produces good results, although its use is somewhat less advantageous than use of the embodiments illustrated in FIGS. 4A and 4B. In the apparatus of FIG. 4C, all nascent gas bubbles 94 are sheared from capillary openings 65 solely by the action of the liquid moving in partially developed laminar boundary layer 54.

Figure 4D:
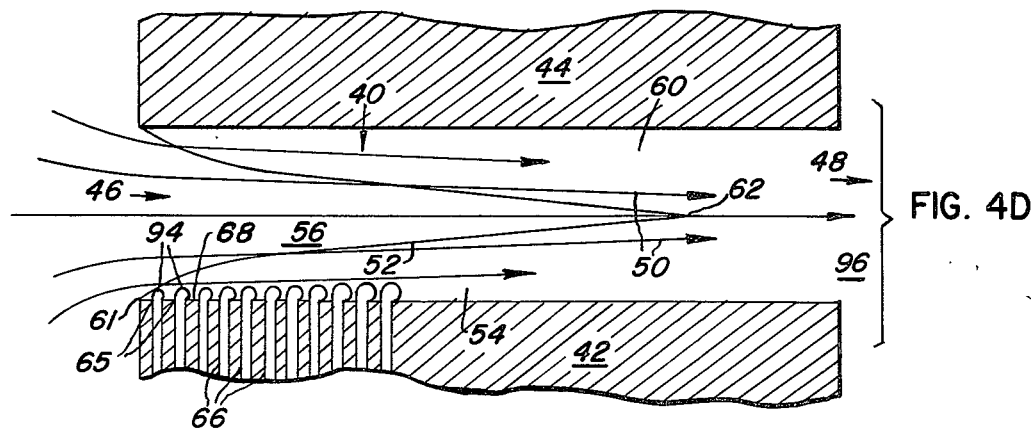
Figure 4E:
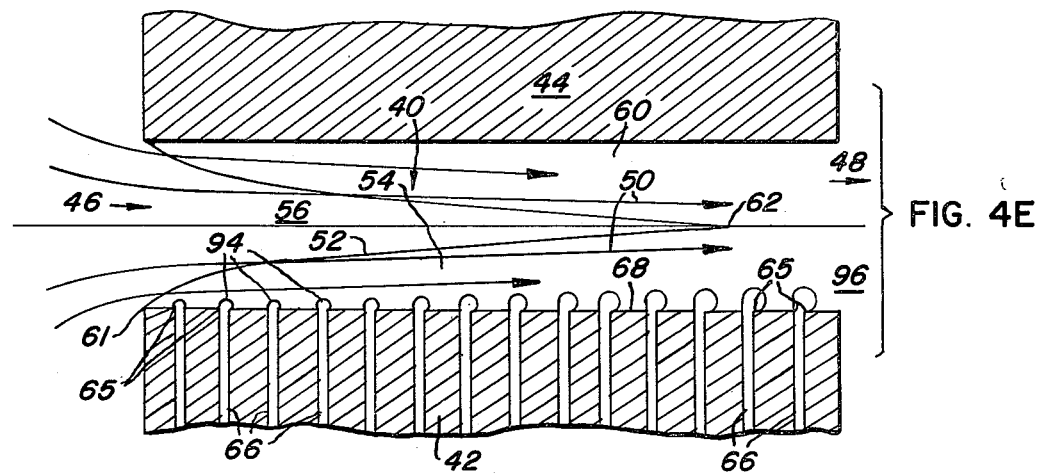

FIGS. 4D and 4E illustrate schematically embodiments of apparatus of this invention in which there are both partially developed and fully developed laminar flow within the shearing liquid transmitting slot. The same numerals are employed to designate similar elements in these figures as in FIGS. 1A, 1B and 4A through 4C.

FIG. 4D shows partially developed laminar boundary layer 54 as it merges with upper laminar boundary layer 60 at point 62 in a zone lying between capillary openings 65 and discharge end 48 of slot 40. In this embodiment, the surface of wall 42 lying beneath the fully developed laminar flow to the right of point 62 in FIG. 4D is free of any capillary openings. FIG. 4E shows a similar embodiment, except that there are additional capillary openings lying beneath the fully developed lamainar flow to the right of point 62, where the two partially developed laminar boundary layers 54 and 60 merge.

Figure 4F:
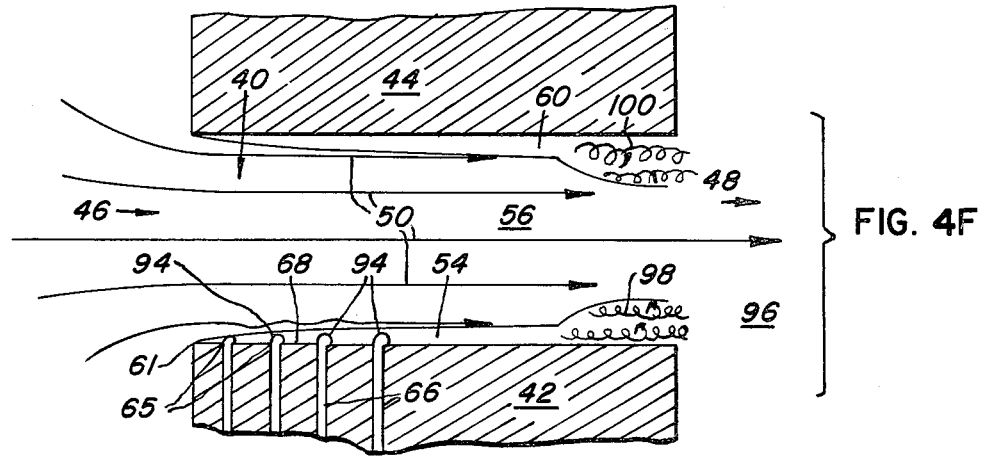

The embodiment of the apparatus of this invention shown schematically in FIG. 4F displays some turbulence within the shearing liquid transmitting slot, but the basic advantage of having the capillary openings in close proximity to the leading edge of the gas diffusing surface to bring them under a partially developed laminar boundary layer still produces useful results. In this embodiment, in which similar elements are identified by designator numerals similar to those employed in the preceding figures, partially developed laminar boundary layer 54 lies immediately adjacent gas diffusing surface 68, with free stream 56 above it. Boundary layer 54 terminates in turbulent zone 98 adjacent discharge end 48 of liquid transmitting slot 40 and within the slot. However, the surface of wall 42 beneath turbulent zone 98 is free of any capillary openings. The same condition prevails in the upper part of slot 40, where partially developed laminar boundary layer 60 terminates in turbulent zone 100 short of discharge end 48 of slot 40. The harmful effect of turbulent zones 98 and 100 in tending to cause collision of the fine gas bubbles and their resulting coalescence into larger bubbles is minimized if free stream 56 extends, as shown in FIG. 4F, to the end of the slot.

In the apparatus of FIGS. 4D and 4F, nascent gas bubbles 94 are all sheared from capillary openings 65 in gas diffusing surface 68 solely by the action of the liquid moving in partially developed laminar boundary layer 54. In the embodiment of FIG. 4E, some of nascent gas bubbles 94 are sheared from capillary openings 65 solely by the action of the liquid moving in partially developed laminar boundary layer 54, while some are sheared solely by the action of the liquid moving in the fully developed laminar flow to the right of point 62 near the discharge end 48 of slot 40.

Apparatus Defined In Terms Of Product Of Maximum Distance From Leading Edge To Farthest Downstream Capillary Openings Times Average Slot Width The apparatus of this invention may also be defined in terms of a "figure of merit" that is the product of (a) the distance separating the inlet end of the liquid transmitting slot from the very small capillary openings that lie farthest downstream on the gas diffusing surface over which the shearing liquid flows, times (b) the average width of that slot throughout the indicated distance.

As already mentioned above, satisfactory results may be obtained in some applications when this figure of merit is no more than about 0.1 square inches. Somewhat improved results are generally obtained when the figure of merit is no more than about 0.075 square inches, and still further improvement is obtained when it is no more than about 0.05 square inches. Very good results are obtained when the figure is no more than about 0.025 square inches, and excellent results when it is 0.01 square inches. For some applications, the preferred product of the indicated width and distance is no more than about 0.005 square inches, or even less.

Applicant has discovered, as has been explained, that contrary to the teaching of the prior art the best formation of fine bubbles is achieved if there is substantially no turbulence over any capillary openings in the gas diffusing surface over which the bubble producing liquid flows. This discovery makes it possible to formulate the figure of merit just defined.

The critical Reynolds number for the distance downstream from the leading edge of a flat plate at which transition to turbulence will occur in liquid flowing across the plate at any given velocity is approximately 350,000. This number also applies to the flow through a parallel flat wall slot, so long as the slot width is at least as great as the figure computed from a second critical Reynolds number, i.e., the critical Reynolds number for slot width. The following two equations, which include the two critical Reynolds numbers referred to, relate the velocity of liquid flow to the viscosity of the liquid and two important dimensions of the slot:

(1) $\dfrac{U \cdot x}{\gamma} \approx 350{,}000$; and (2) $\dfrac{U \cdot w}{\gamma} \approx 2{,}000$;

where $U$ = the free stream velocity of the shearing liquid, $x$ = the distance from the inlet end of the shearing liquid transmitting slot to the farthest downstream capillary openings above which no turbulence will occur, $w$ = the critical slot width for turbulent flow, and $\gamma$ = the kinematic viscosity of the shearing liquid.

(The first critical Reynolds number of 350,000 referred to above is indicated by Schlichting, *Boundary-Layer Theory*, Sixth Ed. (McGraw-Hill, 1968), page 435, to be appropriate for apparatus in which only reasonably conventional precautions are taken — as would usually be true in actual bubble shearing apparatus — to achieve substantially parallel laminar flow. The second critical Reynolds number of 2,000 referred to above is based on experimental work reported in an article by D. Meksyn, "The Stability of Laminar Flow Between Parallel Planes for Two- and Three Dimensional Finite Disturbances," *Zeitschrift fuer Physik*, vol. 178, pp. 159–172 (1964).)

These two equations, together with a third equation to be set forth below, were used to determine the critical distance from the leading edge of the gas diffusing surface of the apparatus of this invention for the most remote capillary opening over which no turbulence will occur when water is used as the shearing liquid and the shearing liquid transmitting slot is defined by parallel planar walls. In these determinations, since the goal of bubble shearing is to produce gas bubbles of very small diameter, capillaries of 20, 30 and 40 micron diameters were examined. The bubbles from these capillary openings were assumed to be 50 microns in diameter. Three typical widths of the shearing liquid transmitting slot were employed — 0.5, 0.1 and 0.040 inches.

The material defining the capillary openings is also important. The bubble shearing achieved by the method and apparatus of this invention will be most effective when the material surrounding the capillary openings in the gas diffusing surface has a low wettability, or in other words a high contact angle, with the shearing liquid. Because the effectiveness of the invention in achieving very fine gas bubbles will vary considerably with this factor, determinations were made for apparatus in which the material defining the capillary openings has a contact angle with the shearing liquid of 20° and 45°, respectively. Under ordinary operating conditions, impurities contained in tap water form a coating on materials such as various metals and glass, and as a result such materials have a contact angle of approximately 20° with the tap water. Contact angles of 90° will give the best results with this invention, but no determinations were made for this figure. Materials having a contact angle with tap water of aaproximately 45° include, for example, polyvinyl chloride and polymethyl methacrylate. Materials having a contact angle with tap water of approximately 90° include, for example, fluorosilicones and fluorocarbon plastics such as the material sold under the trademark Teflon.

With the indicated assumptions, the velocities of shearing liquid required to produce bubbles of the predetermined sizes from the given sized capillary openings were determined as conservative estimates by the following equation:

(3) $U = \dfrac{w^{2}\sigma d\cos^{2}\theta}{72\pi\mu r^{2}\;\dfrac{3}{4}w - r}$, where $U$ = the free stream velocity of the shearing liquid, $w$ = the slot width, $\sigma$ = the surface tension of the shearing liquid, $d$ = the capillary opening diameter, $\theta$ = the contact angle between the shearing liquid and the material surrounding the capillary openings, $\mu$ = the dynamic viscosity of the shearing liquid, and $r$ = the radius of the bubbles formed by use of the apparatus of this invention.

With the resulting values from equation (3) for the velocity of the shearing liquid under the conditions indicated, equation (1) above was employed to determine for each situation the critical maximum distance from the gas diffusing surface leading edge to the most remote capillary openings over which no turbulence will occur. Equation (2) was then used to confirm that for each situation the slot width was great enough under all the respective conditions to permit turbulence to occur just beyond the computed critical distances.

Table I below shows the maximum distance in inches from the leading edge of the gas diffusing surface to the farthest downstream capillary openings over which no turbulence will be produced, for the indicated parameters and water as the shearing liquid:

Improved shearing results are obtained when the figure of merit is reduced to about 0.75. Thus, production of the same 50 micron bubbles is possible with a figure of merit of 0.074 to 0.076 even though the capillary diameter is increased to 30 microns. Similarly, it is possible to produce 50 micron bubbles with a figure of merit of 0.063 to 0.065 even though the contact angle is reduced to the less effective value of 20°.

Still further improvement in bubble shearing is obtained when the figure of merit of the apparatus used is substantially lower, i.e., no more than about 0.05. As the table shows, bubbles of 50 microns diameter can still be produced when the figure of merit is just about 0.05, at 0.055 to 0.057, even though the capillary size is increased to 40 microns. And, likewise, the size of the bubbles can be maintained at 50 microns with a figure of merit of 0.042 to 0.045 even though the contact angle is reduced to the less effective value of 20°.

Very good results are obtained when the figure of merit is about 0.025. Thus, when the figure of merit is somewhat above that figure, at 0.030 to 0.032, bubbles of 50 microns diameter can be produced without the necessity of using material to define the capillary open-

TABLE I

| Bubble size — 50 microns | | | | | | | | | |
|---|---|---|---|---|---|---|---|---|---|
| Contact angle | 20° | | | | | | | | |
| Capillary size in microns | 20 | | | 30 | | | 40 | | |
| Slot width in inches (w) | 0.04 | 0.1 | 0.5 | 0.04 | 0.1 | 0.5 | 0.04 | 0.1 | 0.5 |
| Distance from leading edge to most remote capillary openings in inches (x) | 1.57 | 0.64 | 0.13 | 1.05 | 0.43 | 0.09 | 0.79 | 0.32 | 0.06 |
| Figure of merit in square inches (wx) | 0.063 | 0.064 | 0.065 | 0.042 | 0.043 | 0.045 | 0.032 | 0.032 | 0.030 |
| Contact angle | 45° | | | | | | | | |
| Capillary size in microns | 20 | | | 30 | | | 40 | | |
| Slot width in inches (w) | 0.04 | 0.1 | 0.5 | 0.04 | 0.1 | 0.5 | 0.04 | 0.1 | 0.5 |
| Distance from leading edge to most remote capillary openings in inches (x) | 2.87 | 1.14 | 0.23 | 1.85 | 0.76 | 0.15 | 1.39 | 0.57 | 0.11 |
| Figure of merit in square inches | 0.115 | 0.114 | 0.115 | 0.074 | 0.076 | 0.075 | 0.056 | 0.057 | 0.055 |

As the information in this table confirms, the maximum distance from the inlet end of the shearing liquid transmitting slot to the farthest downstream capillary openings that can be employed without producing turbulence over any capillary openings (referred to in the table as the distance $x$) depends upon a variety of factors, including the slot width. The table indicates that satisfactory production of fine gas bubbles can generally be obtained even if the distance $x$ is substantially more than 1 inch, if the product of the distance $x$ times the average width $w$ of the liquid transmitting slot throughout that distance — the defined figure of merit $wx$ — is no more than about 0.1 square inches. (For width $w$ and distance $x$, see FIG. 12.) Thus, with a small enough slot width, small bubbles of 50 microns diameter can be produced with apparatus for which the distance $x$ is more than 1 or even 2 inches, if the figure of merit is only slightly above 0.1, at 0.114 or 0.115, the contact angle between the material surrounding the capillary openings and water is 45°, and the diameter of the capillary openings is 20 microns.

ings with a contact angle with water that is any better than 20°, even when the capillary opening diameter is 40 microns.

The trend of the data in the table indicates that the bubble shearing results described will be improved if the defined figure of merit is still further reduced to 0.01, or lower. In one embodiment of the apparatus of this invention that produces excellent bubble formation with sewage containing 6 per cent suspended solids as the shearing liquid, the width of the liquid transmitting slot at its entrance end and throughout its length is about 0.125 inches, and the distance from the inlet end to the farthest capillary opening is about 0.045 inches, making a figure of merit of about 0.0056 square inches. In another apparatus according to this invention that achieves equally impressive bubble shearing with water as the shearing liquid, the slot width is about 0.04 inches and the distance $x$ is about 0.045 inches, making the figure of merit even less, about 0.0018 square inches.

If apparatus constructed according to this invention has a figure of merit as defined in this specification ($w$ times $x$) of 0.1 square inches, and the inlet end of the liquid transmitting slot has a width $w$ of 0.1 inches, the distance $x$ from the inlet end to the farthest downstream capillary openings on the gas diffusing surface of the gas transmitting body is 1 inch. With a figure of merit of 0.05 square inches and the same 0.1 inch slot width, the distance $x$ is 0.5 inch. A figure of merit of 0.01 square inches and a slot width of 0.1 inches makes a distance $x$ of 0.1 inch. With the same slot width, a figure of merit of 0.005 makes a distance $x$ of 0.05 inch.

The computations on which Table I above is based were made for a shearing liquid transmitting slot defined by parallel planar walls, but the values for the corresponding figure of merit for an annular slot are of comparable magnitude. Equations (1), (2) and (3) above may be used for an annular slot when the mean diameter of the slot is considerably larger than the slot width — which will ordinarily be the case with bubble shearing apparatus — since such a slot is equivalent to a slot that is first defined by parallel, planar walls and is then curved around upon itself.

If the transverse cross section of the shearing liquid transmitting slot is circular, as for example in the case of a slot having the form of a right circular cylinder, the "average width" of the slot may be considered to be equal to the average radius of the slot in the area of the capillary openings of the gas diffusing surface. (This follows from the fact that the perpendicular distance between the walls of a parallel planar wall slot is hydraulically equivalent to the radius of a slot having a circular cross section.) The term "average width" of the liquid transmitting slot is thus used with this meaning in this specification and claims for any slot of circular cross section, i.e., the average radius of the slot in the indicated area.

As already pointed out in some detail above in the discussion of the definition of the apparatus of this invention by use of a specified hydrodynamic test, it will be understood by those skilled in the art that one practicing the present invention as defined by the stated figure of merit should not only utilize the figure of merit, but should also take reasonable care to avoid including in the bubble shearing apparatus any structural features (such as rough slot walls) that would tend to produce turbulence — or any other structural features (such as too low a ratio between the length and the width of the slot) that would tend to produce vena contracta — with the particular shearing liquid and particular liquid velocity for which the apparatus is designed. It will be further kept in mind by the skilled worker that the effectiveness of a particular figure of merit in producing good bubble formation will always depend to some extent on the nature of the shearing liquid to be used with the apparatus.

As has been pointed out above, prior to applicant's improved bubble shearing invention, the great advantages of utilizing the very effective viscous shearing forces available in the top portions of, and directly above, a partially developed laminar boundary layer in the shearing liquid flowing over a gas diffusing surface were wholly unappreciated by those skilled in the art. Because of this, there was no recognition of the importance of using a narrow liquid transmitting slot (a low value for $w$) to establish a partially developed laminar boundary layer over a significant portion of the capillary openings in the gas diffusing surface, nor of the importance or even the possibility of locating very small capillary openings in the gas diffusing surface in close proximity to the leading edge or inlet end of the slot (a low value for $x$) in order to take advantage of the thinnest portion of that partially developed boundary layer.

As a consequence, no one knew the importance of the low value of the figure of merit with very small capillary openings that provides one definition of the apparatus of this invention. Applicant knows of no one in the prior art who has, even accidentally, given any hint or suggestion of this concept.

Maximum Distance From Leading Edge To Most Remote Capillary Openings

The information in Table I above also shows that this invention may be defined alternatively solely in terms of the maximum distance from the leading edge of the gas diffusing surface to the most remote capillary openings in that surface (distance $x$). This feature standing alone is an important aspect of the present invention.

The data relating to a contact angle of 20°, for example, in the upper half of Table I shows that good bubble shearing can be obtained when the defined distance is no more than 1 inch. Improved shearing results are obtainable when the distance is no more than about 0.5 inch, and still better if it is no more than about 0.1 inch, 0.05 inch, or even lower.

Various Factors Affecting Bubble Size

A number of factors have been discussed that will affect the results achieved with the method and apparatus of the present invention. Some approximate data on various factors that affect the size of the gas bubbles produced in bubble shearing are presented in the form of graphs in FIGS. 5 through 10. In these graphs, bubble diameter is plotted against the following parameters:

TABLE II

| FIGS. | Independent variable |
|---|---|
| 5 | Distance from leading edge of gas diffusing surface to most remote capillary openings |
| 6 | Diameter of capillary openings |
| 7 | Contact angle between water and the material of which the gas diffusing surface is formed |
| 8 | Water velocity through the shearing liquid transmitting slot |
| 9 | Surface tension between gas bubbles and various shearing liquids |
| 10 | Viscosity of the shearing liquid |

The conditions for which the determinations on which the respective graphs are based were made are shown in the following table:

TABLE III

Figure 5:
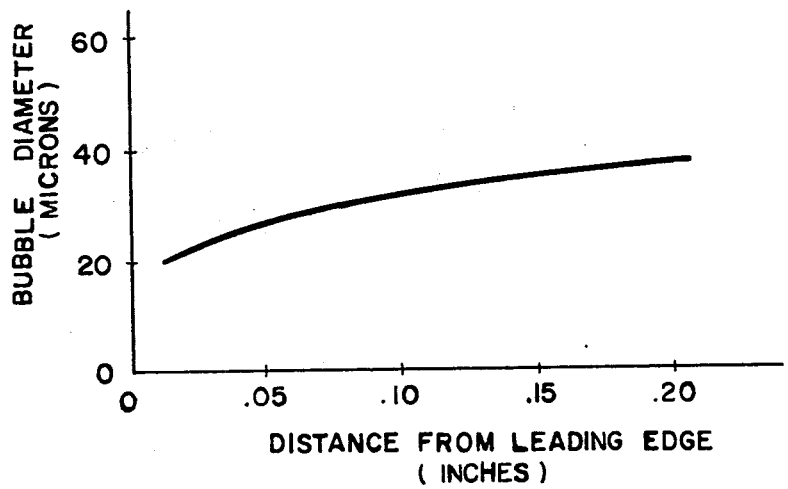
FIGS. 5 through 10 are graphs showing how the bubble diameter of bubbles produced by use of the method and apparatus of this invention varies with changes in certain physical characteristics of the apparatus, operating parameters, and characteristics of the shearing liquid.
Figure 6:
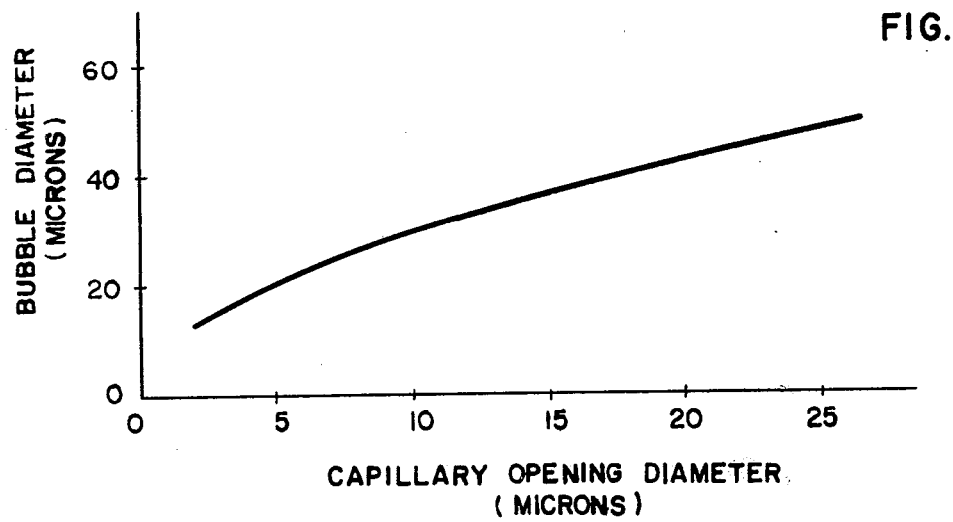
Figure 7:
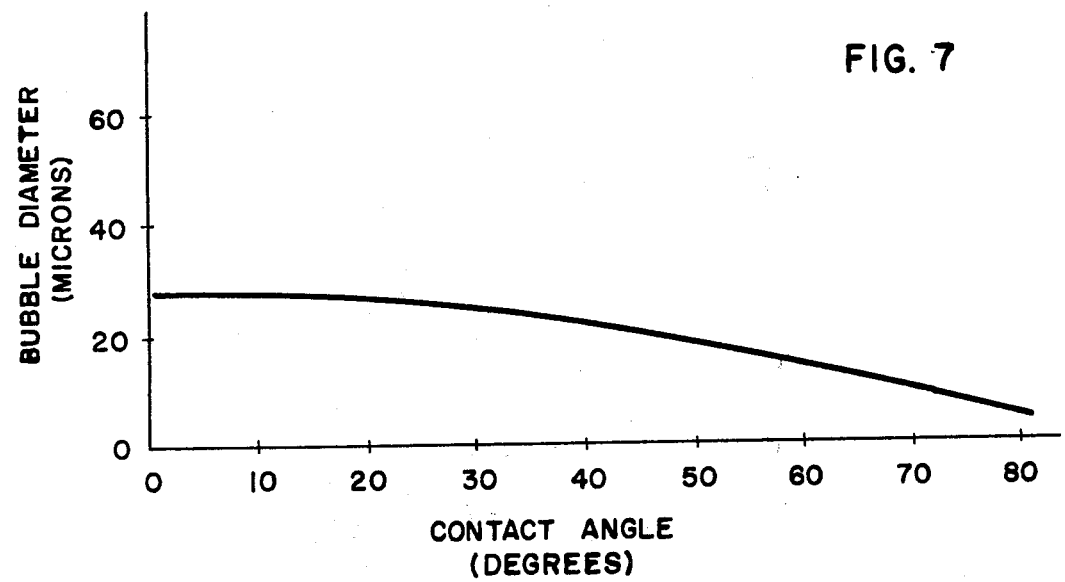

| | FIG. 5 |
|---|---|
| Water velocity | 20 ft./sec. |
| Capillary size (median I.D.) | 8 microns |
| Surface tension | 50–60 dynes/cm. |
| Contact angle | 20° (approx.) |
| Viscosity | 0.01 cp. |
| | FIG. 6 |
| Water velocity | 20 ft./sec. |
| Surface tension | 50–60 dynes/cm. |
| Contact angle | 20° (approx.) |
| Viscosity | 0.01 cp. |
| Leading edge to most remote capillaries | .045 inch |
| | FIG. 7 |
| Water velocity | 20 ft./sec. |
| Capillary size (median I.D.) | 8 microns |
| Surface tension | 50–60 dynes/cm. |

TABLE III-continued

Figure 8:
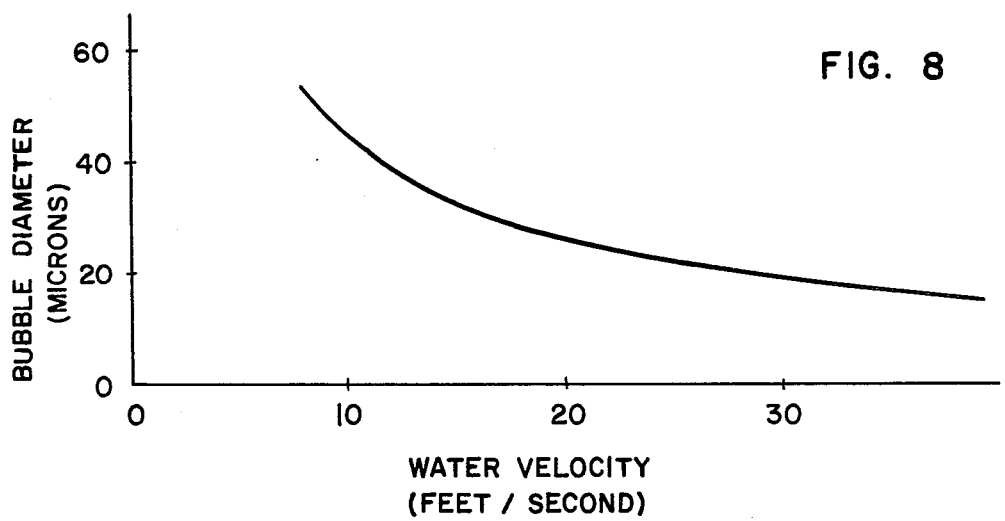
Figure 10:
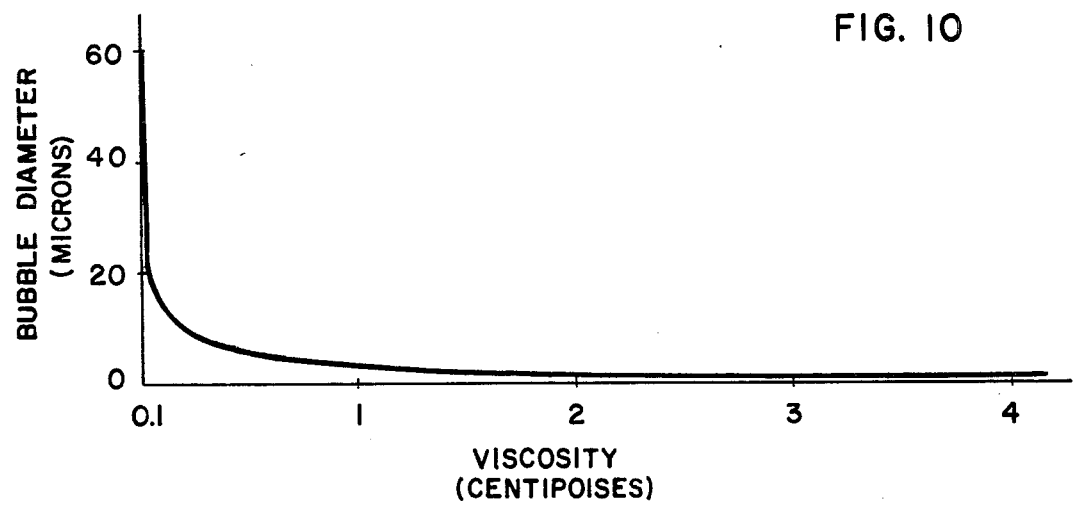

| | |
|---|---|
| Viscosity | 0.01 cp. |
| Leading edge to most remote capillaries | .045 inch |
| FIG. 8 | |
| Capillary size (median I.D.) | 8 microns |
| Surface tension | 50–60 dynes/cm. |
| Contact angle | 20° (approx.) |
| Viscosity | 0.01 cp. |
| Leading edge to most remote capillaries | .045 inch |
| FIG. 9 | |
| Water velocity | 20 ft./sec. |
| Capillary size (median I.D.) | 8 microns |
| Contact angle | 20° (approx.) |
| Viscosity | 0.01 cp. |
| Leading edge to most remote capillaries | .045 inch |
| FIG. 10 | |
| Water velocity | 20 ft./sec. |
| Capillary size (median I.D.) | 8 microns |
| Surface tension | 50–60 dynes/cm. |
| Contact angle | 20° (approx.) |
| Leading edge to most remote capillaries | .045 inch |

Specific Embodiments Of Bubble Shearing Apparatus

FIGS. 11 through 14 illustrate specific embodiments of the bubble shearing apparatus or gas diffuser of this invention.

Diffuser Assembly

Although a diffuser asembly 110 constructed in accordance with the present invention can be utilized in many different environments, the diffuser assembly is shown in FIG. 11 at the bottom 112 of a lake or large body of polluted water 114. The polluted water is deficient in oxygen and this hampers normal life processes required to support fish life and to maintain the proper sanitary conditions in lake 114. By dissolving oxygen in the water, the natural processes of water purification are accelerated. A method and an apparatus for supplementing the natural process of water purification by the addition of oxygen to the water is described in U.S. Pat. No. 3,505,213 to Anthony and Fulton and entitled "Method and Apparatus for Purifying a Natural Body of Water." Although it is contemplated that diffuser assembly 110 will advantageously be utilized to promote the absorption of oxygen by bodies of water, it should be understood that it can be utilized to promote the absorption of other gases by other bodies of liquid as well.

Diffuser assembly 110 includes a plurality of units or modules 118 having substantially vertical and parallel discharge openings or slots 120 from which a mixture of water and small bubbles 122 (FIG. 12) of oxygen flow into lake 114 to oxygenate the lake. Slots 120 may if desired be disposed at other angles to the lake bed, but the vertical orientation is preferred in order to permit fresh supplies of water for oxygenation to rise between the slots most readily from the lower levels of the body of water.

Small bubbles of oxygen 122 are dispersed into a relatively large area of the lake and rise slowly toward the surface of the lake. As bubbles 122 rise, the oxygen within the bubbles is absorbed by the oxygen deficient waters of the lake. Since bubbles 122 of oxygen rise slowly and are very small, with a relatively large surface area per unit volume of oxygen contained within the bubbles, substantially all of the oxygen is absorbed as the bubbles rise toward the surface of lake 114. If the bubbles were relatively large, they would ascend quickly toward the surface of the lake so that there would not be sufficient time for the oxygen to be absorbed. This could result in a "bubbling-off" or dissipation of the oxygen to the atmosphere. Of course, dissipation of oxygen into the atmosphere increases the cost of producing the desired oxygen content in the water of lake 114.

The modules or units 118 are connected with a common source of oxygen under pressure by a gas main or line 124 (FIG. 11). Gas main 124 is connected with gas disperser assemblies or "bars" 128 in each of the units 118 by feeder lines 130. In addition, each of the units 118 is supplied with water under pressure by a common main or pipe 132 to which the diffuser units 118 are connected by a base plate 134. A suitable pump with adjustable output velocity, schematically shown at 133, may be associated with main pipe 132 and operates to draw water from lake 114 and direct it at various velocities, as desired, along pipe 132. A suitable filter may be used to prevent solids from reaching the pump or the disperser assemblies 128. Thus, when the diffuser assemblies 118 are being utilized to oxygenate lake 114, the diffuser assemblies are continuously supplied with gaseous oxygen by gas line 124 and are continuously supplied with water by water main 132. Although gas line 124 and water main 132 have been shown in FIG. 1 resting on bottom 112 of the lake, it should be understood that they could be suspended or otherwise supported above the bottom of the lake, if desired.

Extremely fine bubbles 122 are formed on each side of slots 120 defined by the gas disperser assemblies or bars 128 (see FIG. 12). Thus, small bubbles 122 are formed in groups of bubbles 142 and 144 which extend for the full length of opposite longitudinally extending side walls 146 and 148 of slots 120, each of which slots is approximately 12 inches in vertical length in one embodiment of this apparatus. The bubbles are swept away by water which flows in a continuous stream from chamber 149 through slots 120 into the lake. Water chamber 149 is connected in fluid communication with water line 132 by passages (not shown) extending through mounting plate 134 (FIG. 11).

Because substantially the only effective bubble forming force in this apparatus is the viscous shearing force of the liquid flow, and buoyancy plays essentially no role, the bubbles are swept away before they grow too large. The bubbles produced are so small that it is difficult or impossible for the observer to distinguish individual bubbles by the naked eye, and the bubbles thus take on the appearance of a "gas fog" or milky cloud of bubbles which extend outwardly for a substantial distance from diffuser assembly 110. Since the slowly rising bubbles 122 are dispersed over a relatively large area of lake 114, the gas in the bubbles can be absorbed by the water of the lake before the bubbles reach the surface of the lake.

Bubbles 122 are formed at open ends 154 of capillary passages 158, which extend from gas plenum 160 through side walls 146 and 148 of slot 120 (FIG. 12). Each of the upright gas chambers 160 is connected in fluid communication with gas line 124, so that a continuous stream of gas under pressure flows from line 124 through feeder tubes 130 (FIG. 11) to gas plenums 160, and then to open ends 154 of capillary passages 158.

It should be pointed out that this invention is useful in applications, as for example some industrial applications, in which an entire quantity of liquid into which gas bubbles are to be diffused is passed through pump 133, main liquid line 132, liquid chamber 149, and slots 120. In such a case, the term "body of liquid into which fine bubbles are to be diffused" refers to all the liquid that has already flowed through slots 120 of the gas diffusing apparatus and has been accumulated in a subsequent pipe, channel, or other vessel for further handling.

Shearing Liquid Transmitting Slot

As water leaves chamber 149 to enter any given slot 120, it flows past rounded leading edges 150 on walls 146 and 148. When water is the shearing liquid (as in FIG. 12) the length of travel through slot 120 should preferably be at least about two times the width of the slot, although it may be less for more viscous liquids. These features, especially the rounded leading edges, will help to establish in slot 120 the substantially parallel laminar flow, including a partially developed laminar boundary layer, that is characteristic of this invention. The L/D ratio should not be made too large, however, or there will be too high a pressure drop and accompanying energy requirement for the apparatus, and a clogging problem with some applications such as sewage treatment.

As illustrated in FIG. 12, each slot 120 throughout its length should preferably have a substantially uniform width measured perpendicular to the direction of flow. In the embodiment shown, slot 120 has a rectangular transverse cross section from its inlet end to its discharge end. As will be seen, a substantially straight, unimpeded path is provided for liquid flow through the slot, by utilizing side walls 146 and 148 that are substantially planar and parallel to each other. These features help to produce regularity and stability of flow of the shearing liquid through the liquid transmitting slot, which encourages the establishment of the defined laminar flow regime.

As already indicated above, the width of slot 120 may be varied depending upon a number of factors including, among other things, the nature of the shearing liquid. A slot width of 0.5 inches or even more may be used with shearing liquids of high viscosity, although with wider slots greater precautions may have to be taken to achieve substantially parallel laminar flow through the slot. A slot width of 0.125 inches has been used with sewage containing 6 per cent suspended solids. A slot width of 0.040 inches has been used with 1 per cent suspended solids sewage, and a slot width of 0.030 inches or even as low as 0.020 inches with water as the shearing liquid.

Other things being equal, the slot width $w$ (FIG. 12) should be wider for larger capillary openings, so that collision and coalescence of fine bubbles to form larger bubbles can be minimized. The slot width may be made wider than would otherwise be feasible when the shearing liquid employed, such as for example sewage, has a higher viscosity. This will have the advantage of helping to minimize clogging of the slot by particulate matter in suspension in the sewage. In the design of an apparatus according to this invention, the considerations mentioned must be balanced against the fact that the smaller the width of slot 120 is made, the lower the power input will be for a given velocity of shearing liquid.

It should be noted that each elongated opening or slot 120 of diffuser assembly 110 has a gap which can be easily set during manufacture of the diffuser assemblies to provide the desired relationship between the width of the stream of water flowing through the slots and the gas bubbles formed at the sides of the slots. Or, if desired, the width of the slot may be left adjustable — as, for example, from zero to some predetermined width — so that it may be changed for various conditions of use of the apparatus. If the width of the slot is adjustable through a predetermined range, the present invention concept is utilized if either the defined substantially parallel laminar flow or the specified figure of merit is present for at least a portion of that range of slot widths.

FIG. 13 is a schematic cross sectional view of another embodiment of a gas transmitting body and a slot-defining member useful in the apparatus of this invention. In this embodiment, cylindrical gas transmitting body 172 has a plurality of gas transmitting passages 174 extending therethrough, each of which passages terminates in a capillary opening 176 at gas diffusing surface 178. Annular shearing liquid transmitting slot 180 is formed by cylindrical slot-defining member 182, positioned concentrically with member 172. As with the embodiment of FIG. 12, gas is introduced into gas plenum 160 with member 172 and flows out through capillary passages 174 to gas diffusing surface 178, where nascent gas bubbles are formed at capillary openings 176 and are sheared off by the shearing liquid flowing longitudinally through slot 180.

Gas Transmitting Body

Capillary openings 154 have substantially the same shape, size, and location in liquid transmitting slot 120 in both gas diffusing surfaces 146 and 148, on opposite sides of the slot (FIG. 12). Gas transmitting passages 158 are preferably substantially perpendicular to the planes tangent to gas difussing surfaces 146 and 148, respectively. The latter surfaces are preferably generally planar, but need not be exactly so.

To achieve the smallest bubbles possible with this invention, the material surrounding capillary openings 154 in gas diffusing surfaces 146 and 148 should be one having a low wettability, or high contact angle, with the shearing liquid that flows through slot 120. Thus, the material is desirably one — such as, for example, polystyrene or polyethylene — having a contact angle of at least 60° with tap water when that liquid is the shearing medium used with this invention.

Open ends 154 of capillary passages 158 must have a small diameter if small bubbles are to be formed as gas flows from the ends of the capillary tubes. In the actual embodiment of which FIG. 12 is a schematic representation, capillary passages 158 are defined by hollow fiber glass tubes having cylindrical internal passages with a diameter of from about 3 to about 30 microns, with their median diameter being about 8 microns. Hollow fiber glass tubes with a diameter from about 6 microns to about 12 microns may also be used.

As disclosed in my pending application Ser. No. 123,693, now abandoned, these straight fiber glass tubes are relatively easy to embed in support bars 166 in parallel relationship with each other and in a perpendicular relationship with the central plane of slot 120. This embedding of capillary tubes 158 may be accomplished, for example, by positioning the tubes in the desired relationship and flowing a suitable sealing material 162 around the tubes. When sealing material or binder 162 solidifies, it sealingly interconnects capillary tubes 158 to form the bars 166 and prevent fluid flow around the tubes.

Other gas transmitting bodies may be used, if desired, with the method and apparatus of this invention. The gas transmitting body may be formed, for example, by drilling holes in member 166 or may be formed from porous sintered metal, porous ceramic material, metal or plastic screen or mesh material, various other woven materials, a porous sheet or membrane, or any other porous or foraminous body having capillary openings in a gas diffusing surface. As explained above, the term "capillary openings" is used in this specification and claims to mean any openings small enough to produce fine gas bubbles, no matter what the nature of the gas diffusing surface is on which the bubbles are formed, or the nature of the gas transmitting passages through which gas flows to reach those openings.

Other porous composite materials besides hollow capillary strands 158 embedded in sealing material or binder 162 may also be used. In addition, solid filaments of glass, plastic or metal may be fused or sintered together in bundles to define gas transmitting passages in the form of the interstices between adjacent, substantially parallel filaments. Solid glass or plastic filaments are available, for example, with outside diameters of about 10 to 20 microns, and solid metal wire with outside diameters of about 40 to 80 microns. When such filaments are pressed together and fused or sintered, the resulting interstices between filaments will provide quite small gas transmitting passages, which terminate in capillary openings at which fine gas bubbles can be formed and sheared off in accordance with the teaching of this invention.

Whatever the material may be of which the gas transmitting body is formed, the gas transmitting body and its gas diffusing surface should preferably have the characteristics discussed below in connection with the illustrative showing of FIG. 14.

Since capillary tubes 158 in the embodiment shown are relatively small and closely spaced along the entire length of the slot 120, a large number of bubbles of a small diameter can be formed along sides 146 and 148 of slot 120. Bubbles of air in water ranging up to about 100 or 200 microns in diameter are readily obtained. As already mentioned above, with a preferred embodiment of the apparatus of this invention, bubbles of air can be formed in water which have a median diameter of only about 25 to 30 microns. With higher viscosity liquids such as sewage, the majority of the bubbles will be even smaller.

As has been pointed out, the showing in FIG. 12 is a schematic one. In particular, gas transmitting passages 158 which extend through the wall of gas transmitting body or gas bar 166 to form capillary openings 154 in gas diffusing surfaces 146 and 148 are shown schematically embedded in hardened binder 162 as a matrix. As shown, capillary tubes 158 and binder 162 are secured on both sides of the assemblage to support plates 170 to form gas bar 166 enclosing gas plenum 160.

FIG. 14, on the other hand, is drawn from a photomicrograph made of an actual gas diffusing surface 146 or 148 in a gas bar 166. Capillary openings 154 are the open ends of discrete hollow fiber glass capillary strands or tubes 158 embedded in hardened epoxy plastic 162 as a matrix. Support plates 170, which complete gas diffusing surface 146, are indicated by broken lines on either side of FIG. 14. The distance between the two plates is about 0.020 inches.

The flow of shearing liquid across gas diffusing surface 146 (or 148) in FIG. 14 is from left to right in the figure, while the gas flow is out of the paper. Nascent gas bubbles formed at capillary openings 154 are thus sheared off as extremely fine bubbles, and are swept to the right towards the body of liquid into which they are to be diffused.

The maximum bubble size produced with the method and apparatus of this invention, as has been stressed above, is affected by many factors. One of the most important of these is the size of capillary openings 154 in gas diffusing surface 146 or 148. It is considered that to take full advantage of the benefits produced by the other important features of the present invention, substantially all the capillary openings in the gas diffusing surface should have a diameter no larger than about 100 microns. Considerably improved results are obtained if substantially all the capillary openings have a diameter no larger than about 50 microns, with further improvement when that figure is about 25 microns. For preferred results, the maximum capillary diameter should be about 5 microns.

Another measure of the size of the capillary openings is related to the bubble size that is desired from use of this invention. When the apparatus of this invention is designed to diffuse into a body of liquid gas bubbles of a predetermined size, the maximum diameter of the capillary openings in the gas diffusing surface should be no greater than about that predetermined size. For better results, the maximum capillary diameter should be no more than approximately one-half the predetermined maximum bubble diameter, and for best results no more than about one-fourth that dimension.

In general, the capillary diameters should preferably be made as small as is practicable without making the gas pressure drop through the capillaries too high.

Each fiber glass hollow capillary strand or tube 158 has a cross section of substantially uniform size and shape throughout its length, being substantially a right circular cylinder in shape. As a consequence, each of the hollow capillary strands provides a straight, unimpeded path for gas flow through the gas transmitting body past which the shearing liquid flows. The passage provided by each hollow capillary strand 158 should preferably extend, adjacent its respective capillary opening, in a direction substantially perpendicular to the plane tangent to gas diffusing surface 146. It is believed that regularity in all these aspects of the size, shape and orientation of gas passages 158, by tending to reduce turbulence within those passages, will contribute to greater uniformity of bubble size in the fine bubbles resulting from the use of this invention.

Gas turbulence within capillary passages 158 should also be minimized by selecting a length for each passage that is at least 10 times the diameter of the passage. It is believed that an L/D ratio of at least 20/1 will give still better results.

The gas transmitting capillary passages 158 should also have a minimum L/D ratio to minimize backing up by the shearing liquid after a gas bubble has been sheared from capillary opening 154. Backing up of liquid can result in clogging, when the liquid evaporates and precipitates out dissolved salts after the gas again fills the capillary passage. These advantages of a minimum L/D ratio for the gas passages must of course be balanced against the disadvantage of any increase in the pressure drop through the passages.

In FIG. 12, capillary openings 154 are arranged in a plurality of straight rows perpendicular to the flow of shearing liquid through slot 120. In FIG. 14, the capillary openings are randomly located across gas diffusing surface 146. Although the benefits of the present invention can be obtained with only a few capillary openings disposed along the direction of flow, there should be an average of at least about five openings in that direction in substantially all portions of the surface. If a straight edge rule is laid across FIG. 14 in the direction of shearing liquid flow (from left to right across the page), it will be seen that in this embodiment of a gas diffusing surface there are on the average more than 10 capillary openings distributed across that surface from its inlet end to its discharge end. An average of as many as 20 to 40 openings in the direction of shearing liquid flow have been used to advantage, and still more could be employed if desired.

To take the greatest advantage of the fine bubble formation resulting from the use of this invention, the land areas in the gas diffusing surface should not be too narrow, or in other words capillary openings 154 should not be too closely spaced to each other. To this end, each opening 154 is preferably surrounded by a minimum land area on all sides that is sufficiently extensive in a plane generally tangent to the outermost points on said gas diffusing surface to substantially avoid coalescence or collision of a gas bubble formed at that opening with a bubble formed at any of the other single openings to produce a bubble having a diameter larger than the predetermined maximum bubble diameter. Some such combining of gas bubbles either at their point of formation or downstream is acceptable, but this effect should be minimized as much as is practicable.

In a preferred embodiment, each capillary opening 154 is surrounded by a minimum land area elliptical in shape that extends on each side of the opening in the direction perpendicular to the direction of liquid flow through the liquid transmitting slot by a distance at least about equal to the maximum bubble diameter, and on each side of the opening in the direction of liquid flow by a distance equal to at least about three times the maximum bubble diameter, measured in a plane generally tangent to the outermost points on the gas diffusing surface.

Gas diffusing surface 146 shown in FIG. 14 is generally planar in configuration, to produce greater stability in the laminar flow through slot 120, and thus the best fine bubble formation. A planar gas diffusing surface will produce sharper edges for capillary openings 154, which should result in smaller bubbles more nearly uniform in size. In apparatus for use in sewage treatment, it will also help reduce clogging of slots 120 by solids suspended in the sewage that passes through the slots as the shearing liquid.

The size of the bubbles can be further decreased if the wettability of the material surrounding the capillary openings in the gas diffusing surface with the shearing liquid is low, or in other words the contact angle is high. Both hollow fiber glass strands 158 (which terminate in capillary openings 154) and epoxy matrix material 162 have a contact angle with tap water of approximately 20°. The preferred contact angle when tap water is the shearing liquid is at least about 60°.

EXAMPLES

Figure 15:
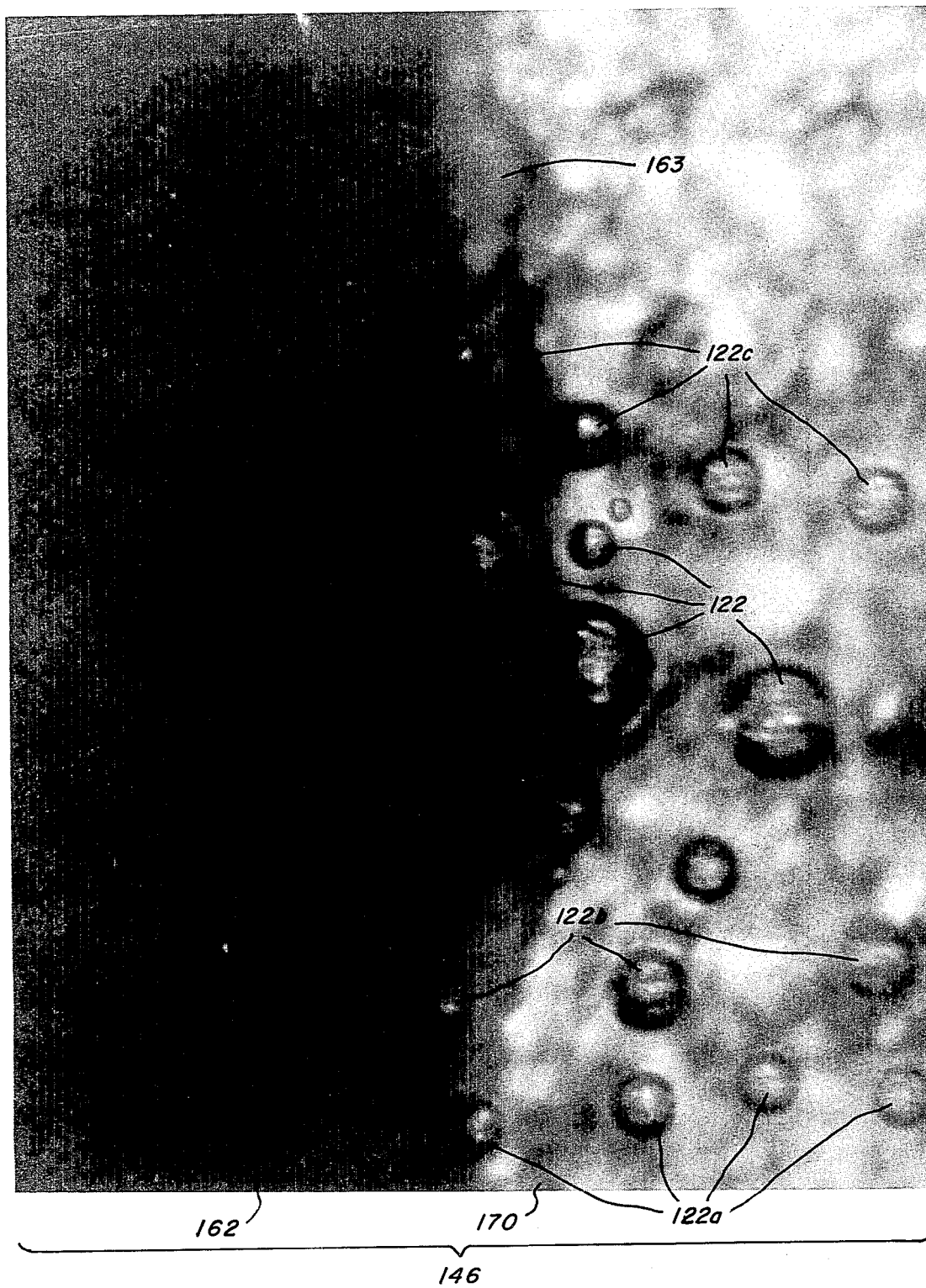
FIGS. 15 and 16 are photomicrographs, at an enlargement of about 280 times in the original figure submitted as a part of this application, showing the formation of fine bubbles of air in water resulting from the use of the method and apparatus of this invention.
Figure 16:
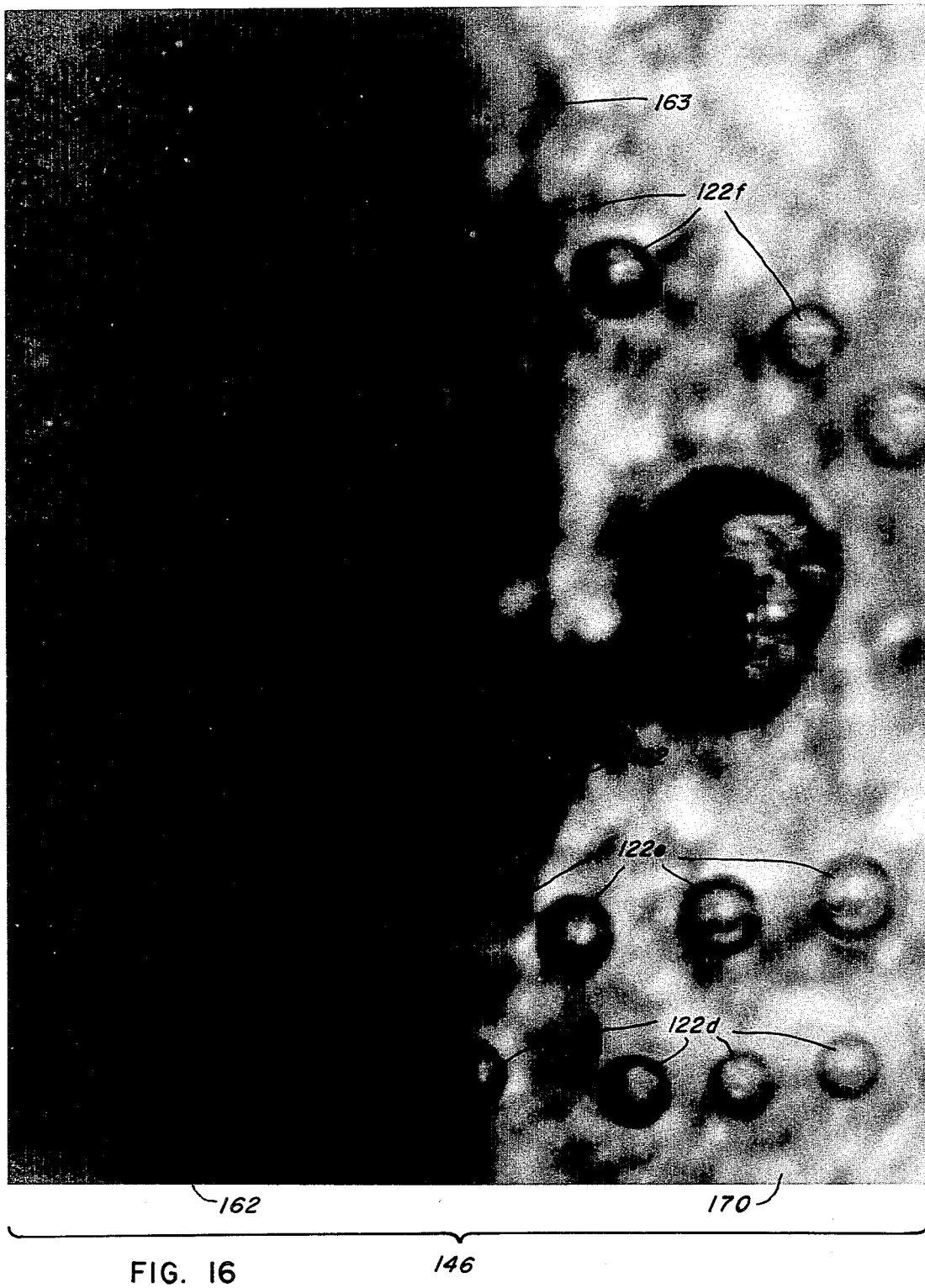

FIGS. 15 and 16 are photomicrographs, at an enlargement of about 280 times in the original figure submitted as a part of this application, which show the formation of very fine bubbles of air resulting from the use of the present invention.

These photomicrographs show an identical area in a gas diffusing surface and generally similar bubble formations, but were taken at different times so that they show different groups of bubbles in the respective bubble formations. One of the parallel planar sides of the shearing liquid transmitting slot was a gas diffusing surface of the type shown in FIG. 14. The other side was a glass plate through which the photomicrographs were taken. The shearing liquid was tap water.

The dark portions on the left-hand side of the photomicrographs in FIGS. 15 and 16 represent hollow capillary strands 158 embedded in epoxy binder 162 as a matrix, but because of the lighting problem, capillary openings 154 cannot be distinguished. A few gas bubbles 122 sheared from openings 154 by the advancing shearing liquid can be made out faintly over these dark portions of gas diffusing surface 146 where they join the medium dark, narrow, vertical band 163 (which may represent a layer of epoxy binder without any capillary strands 158 embedded therein) in the central part of each photomicrograph.

The bright portions on the right-hand side of FIGS. 15 and 16 represent the edges of metal support plates 170. Because there is more reflected light here, small air bubbles 122 can be seen quite clearly. The presence of identifiable groups of gas bubbles in relatively well aligned "strings," all of the bubbles in a given string being very nearly of the same size, shows the presence of the substantially parallel laminar flow that is characterized above as one of the essential features of this invention. Strings of bubbles 122a, 122b and 122c in FIG. 15, as well as strings of bubbles 122d, 122e and 122f in FIG. 16, all provide clear evidence of substantially parallel laminar flow, including a partially developed laminar boundary layer. The strings of bubbles are not entirely straight because of minimal "detours," such as might be caused by tiny local irregularities in the gas diffusing surface, but such minor deviations are always to be expected even in highly stable laminar flow. Presumably each separately identifiable string of bubbles originated at a different capillary opening.

If the few atypically large or small bubbles in FIGS. 15 and 16 are omitted from consideration, it is seen that the great bulk of the bubbles are quite uniform in size. Thus, the diameter of the smallest bubbles that fall within normal limits of size appear to have diameters approximately two-thirds as large as the diameters of the largest bubbles that fall within those normal limits.

Photomicrographs of somewhat larger fields showing similar air bubble formation (which were made at an enlargement of about 200 times, and include the partial views seen in FIGS. 15 and 16, respectively) were examined with the aid of a sizing grid in the form of a clear plastic overlay. In this manner, the estimated average bubble sizes and maximum bubble sizes given below were determined for the two larger photographs. Similar determinations were also made for the other examples given below.

For all the photomicrographs examined (including FIGS. 15 and 16), the following conditions were held constant:

| | |
|---|---|
| Shearing liquid | Tap water |
| Water pressure | 3.0 psig |
| Median capillary size | 8 microns (approx.) |
| Active gas diffusing surface area | 0.00042 square feet |
| Slot width | 0.040 inches |
| Inlet end of slot to most | 0.045 inches |

| | |
|---|---|
| remote capillary opening | |
| Arrangement of capillary openings | As illustrated in FIG. 14 |

1

Six high speed frames were exposed under the following operating conditions:

| | |
|---|---|
| Liquid velocity | 8.3 ft./sec. |
| Gas pressure | 20 psig |
| Gas flow for 3 inch slot | 0.00175 scfm |
| Gas bar | Unsanded* |

*Note — In Examples 1 through 3, the gas transmitting bodies or "bars" were used as usually fabricated in accordance with this invention. In Examples 4 through 6, the edges of the gas bars that constitute the gas diffusing surfaces were sanded, in an effort to make those surfaces more uniform and thereby improve the bubble shearing action of the apparatus. As the bubble sizes obtained show, however, the sanding did not achieve the results desired, and actually appears to have produced larger bubbles than were produced with the unsanded gas bars.

The following results were observed when the photomicrographs taken under the indicated conditions were examined as explained above:

| | |
|---|---|
| Bubble size for all frames | 37 microns = median** 200 microns = maximum** |
| Bubble size for 4th frame (of which Figure 15 is a portion) | 39 microns = median 120 microns = maximum |
| Bubble size for 7th frame (of which Figure 16 is a portion) | 39 microns = median 200 microns = maximum |

** Note — In determining both median and maximum bubble size, all bubbles were considered, including any atypical bubbles that fall at the extremes of size.

B.

Seven high speed frames were exposed under the following operating conditions:

| | |
|---|---|
| Liquid velocity | 8.3 ft./sec. |
| Gas pressure | 30 psig |
| Gas flow for 3 inch slot | 0.0061 scfm |
| Gas bar | Unsanded |

The following results were observed when the photomicrographs taken under the indicated conditions were examined as explained above:

| | |
|---|---|
| Bubble size for all frames | 35 microns = median 225 microns = maximum |

EXAMPLE 2

A.

Seven high speed frames were exposed under the following operating conditions:

| | |
|---|---|
| Liquid velocity | 16 ft./sec. |
| Gas pressure | 30 psig |
| Gas flow for 3 inch slot | 0.0061 scfm |
| Gas bar | Unsanded |

The following results were observed when the photomicrographs taken under the indicated conditions were examined as explained above:

| | |
|---|---|
| Bubble size for all frames | 28 microns = median 100 microns = maximum |

B.

Seven high speed frames were exposed under the following operating conditions:

| | |
|---|---|
| Liquid velocity | 4.4 ft./sec. |
| Gas pressure | 20 psig |
| Gas flow for 3 inch slot | 0.00175 scfm |
| Gas bar | Unsanded |

The following results were observed when the photomicrographs taken under the indicated conditions were examined as explained above:

| | |
|---|---|
| Bubble size for all frames | 43 microns = median 200 microns = maximum |

EXAMPLE 3

A.

Five high speed frames were exposed under the following operating conditions:

| | |
|---|---|
| Liquid velocity | 22.5 ft./sec. |
| Gas pressure | 30 psig |
| Gas flow for 3 inch slot | 0.0061 scfm |
| Gas bar | Unsanded |

The following results were observed when the photomicrographs taken under the indicated conditions were examined as explained above:

| | |
|---|---|
| Bubble size for all frames | 26 microns = median 75 microns = maximum |

B.

Seven high speed frames were exposed under the following operating conditions:

| | |
|---|---|
| Liquid velocity | 22.5 ft./sec. |
| Gas pressure | 20 psig |
| Gas flow for 3 inch slot | 0.00175 scfm |
| Gas bar | Unsanded |

The following results were observed when the photomicrographs taken under the indicated conditions were examined as explained above:

| | |
|---|---|
| Bubble size for all frames | 25 microns = median 50 microns = maximum |

EXAMPLE 4

A.

Five high speed frames were exposed under the following operating conditions:

| | |
|---|---|
| Liquid velocity | 7.9 ft./sec. |
| Gas pressure | 20 psig |
| Gas flow for 3 inch slot | 0.0032 scfm |
| Gas bar | Sanded |

The following results were observed when the photomicrographs taken under the indicated conditions were examined as explained above:

| Bubble size for all frames | 76 microns = median |
| --- | --- |
| | 200 microns = maximum |

B.

Seven high speed frames were exposed under the following operating conditions:

| Liquid velocity | 7.9 ft./sec. |
| --- | --- |
| Gas pressure | 30 psig |
| Gas flow for 3 inch slot | 0.012 scfm |
| Gas bar | Sanded |

The following results were observed when the photomicrographs taken under the indicated conditions were examined as explained above:

| Bubble size for all frames | 98 microns = median |
| --- | --- |
| | 300 microns = maximum |

EXAMPLE 5

A.

Six high speed frames were exposed under the following operating conditions:

| Liquid velocity | 16 ft./sec. |
| --- | --- |
| Gas pressure | 30 psig |
| Gas flow for 3 inch slot | 0.012 scfm |
| Gas bar | Sanded |

The following results were observed when the photomicrographs taken under the indicated conditions were examined as explained above:

| Bubble size for all frames | 52 microns = median |
| --- | --- |
| | 100 microns = maximum |

B.

Seven high speed frames were exposed under the following conditions:

| Liquid velocity | 20.7 ft./sec. |
| --- | --- |
| Gas pressure | 30 psig |
| Gas flow for 3 inch slot | 0.012 scfm |
| Gas bar | Sanded |

The following results were observed when the photomicrographs taken under the indicated conditions were examined as explained above:

| Bubble size for all frames | 40 microns = median |
| --- | --- |
| | 75 microns = maximum |

EXAMPLE 6

Six high speed frames were exposed under the following operating conditions:

| Liquid velocity | 20.7 ft./sec. |
| --- | --- |
| Gas pressure | 40 psig |
| Gas flow for 3 inch slot | 0.027 scfm |
| Gas bar | Sanded |

The following results were observed when the photomicrographs taken under the indicated conditions were examined as explained above:

| Bubble size for all frames | 75 microns = median |
| --- | --- |
| | 125 microns = maximum |

B.

Eight high speed frames were exposed under the following conditions:

| Liquid velocity | 20.7 ft./sec. |
| --- | --- |
| Gas pressure | 50 psig |
| Gas flow for 3 inch slot | 0.052 scfm |
| Gas bar | Sanded |

The following results were observed when the photomicrographs taken under the indicated conditions were examined as explained above:

| Bubble size for all frames | 100 microns = median |
| --- | --- |
| | 150 microns = maximum |

As is seen from the above results, the smallest bubbles were obtained with the unsanded bar under the operating conditions of Example 3, the next smallest bubbles with that bar under the conditions of Example 2, and the next smallest in Example 1. The same gas bar and target area were used in all these three examples.

With the sanded gas bar, the best bubble shearing was obtained in Example 5, and the next best in Example 6. Example 4 gave the poorest results. The bar with the sanded gas diffusing surface was in all other respects the same type of bar as the unsanded bar.

The bubble shearing of Examples 1 through 6, as explained above, was carried out with one wall of the shearing liquid transmitting slot formed by a flat glass plate, which made it possible to photograph sample gas bubbles produced under the indicated conditions. In Examples 7 through 9 below, the apparatus used was not modified in this way, but was operated as it would have been operated in actual use, with a gas diffusing surface similar to the surface illustrated in FIG. 14 on both sides of the shearing liquid transmitting slot.

EXAMPLE 7

Excellent oxygen bubble shearing was visually observed from use of one embodiment of the apparatus of this invention, with tap water as the shearing liquid, under substantially the following conditions:

| Slot width | 0.040 inches |
| --- | --- |
| Volumetric flow rate for shearing liquid | 2 gallons/min./inch of slot |
| Linear flow rate for shearing liquid | 15 ft./sec. |
| Gas pressure | 30 psig |
| Gas flow rate | 50 scfm/sq. ft. of active gas diffusing area |
| Median capillary diameter | 8 microns |

EXAMPLE 8

Excellent oxygen absorption, more than 90 per cent of the oxygen supplied to the body of liquid, was obtained with the use of the same apparatus, with 1 per cent suspended solids sewage as the shearing liquid, under substantially the following conditions:

| | |
|---|---|
| Slot width | 0.040 inches |
| Volumetric flow rate for shearing liquid | 2.5 gallons/min./inch of slot |
| Linear flow rate for shearing liquid | 20 ft./sec. |
| Gas pressure | 30 psig |
| Gas flow rate | 45 scfm/sq. ft. of active gas diffusing area |
| Median capillary diameter | 8 microns |

EXAMPLE 9

Excellent oxygen absorption, again more than 90 per cent, was also obtained with use of the same apparatus, except that the slot width was set at 0.125 inches, with 6 per cent suspended solids sewage as the shearing liquid, under substantially the following conditions:

| | |
|---|---|
| Slot width | 0.125 inches |
| Volumetric flow rate for shearing liquid | 2.5 gallons/min./inch of slot |
| Linear flow rate for shearing liquid | 7–8 ft./sec. |
| Gas pressure | 30 psig |
| Gas flow rate | 15 scfm/sq. ft. of active gas diffusing area |
| Median capillary diameter | 8 microns |

Because of the higher viscosity of the 6 per cent suspended solids sewage and the resulting improved bubble shearing, approximately the same oxygen absorption efficiency was obtained with 6 per cent solids sewage as with 1 per cent solids sewage, at about one-third the linear flow rate and approximately the same energy expended for pumping.

SPECIFIC EMBODIMENTS OF GAS BAR

Because of their elongated shape (best seen in FIGS. 18A and 24 A), gas transmitting bodies 166 such as illustrated in FIG. 12 are for convenience usually referred to as gas "bars."

FIGS. 18A and 18B show a gas bar 166a that may be incorporated in the gas diffusing apparatus of this invention in the manner illustrated schematically in FIG. 12. Gas bar 166a is an enclosed container with a gas inlet opening 184 provided through elbow joint 186, suitably threaded for attachment to a gas feeder line 130 (FIG. 12). This embodiment of the gas transmitting body has two walls 146 and 148 with a plurality of gas transmitting passages extending therethrough, to permit gas to escape from interior enclosed chamber 160. Walls 146 and 148 are the gas diffusing surfaces of gas bar 166a.

FIGS. 24A through 24C show another embodiment of a gas bar 166b for use with this invention. This embodiment has only one gas diffusing surface, wall 148, to permit gas to escape from interior enclosed chamber 160. As in gas bar 166a, inlet opening 184 and fitting 186 are provided in gas bar 166b.

As will be explained in more detail below, each gas diffusing surface 146 and 148 in specific gas bars 166a and 166b comprises a sandwich of two thin metal support plates — members 188 and 190 for gas bar 166a, and 192 and 194 for gas bar 166b — on both sides of a plurality of hollow fiber glass capillary strands 206 embedded in epoxy 162 as a matrix. Because the support plates are so thin (FIGS. 18B, 24B and 24C), capillary openings 154 lie in close proximity to boundary defining edges 196 and 198 of the gas diffusing surfaces of gas bars 166a and 166b, respectively, which become the leading edges of slots 120 when the gas bars are in place in the gas diffusing apparatus of this invention. (The flow of the shearing liquid in the bubble shearing apparatus in which gas bar 166a or 166b is installed is in the upward direction in FIGS. 18B, 24B and 24C.)

As used in this specification and claims, the term "gas diffusing surface" includes the sides of the two support plates but, as already indicated above, the "active area" of that surface includes only the area defined by the boundary lines tangent of the outermost capillary openings. (See FIG. 14, for example.)

In the embodiments shown in FIGS. 18 and 24, each support plate is about 0.025 inches thick, which brings the capillary openings as close to the leading edge of the gas diffusing surface as is structurally practicable in these embodiments. Since the layer of hollow capillary strands 206 embedded in matrix 162 is about 0.020 inches thick, this positions the most remote capillary openings a total of about 0.045 inches from leading edges 196 and 198, respectively.

Good results can be obtained under some operating conditions with the distance from the indicated boundary defining edge of the gas bar of this invention to the most remote capillary opening being about 1.0 inch. Improved results are obtained if that distance is about 0.5 inch, and still better results if it is about 0.1 inch, 0.05 inch, or even smaller.

Leading edges 196 and 198 are rounded to improve the stability of flow through slot 120. This feature helps produce stable laminar flow, including a partially developed laminar boundary layer, in the shearing liquid transmitting slot. The rounded edges are shown in FIGS. 18B, 24B and 24C as accurately as is possible at the scale of those drawings.

Gas diffusing surfaces 146 and 148 in gas bars 166a and 166b are similar to the surfaces shown in FIG. 14 and described above in this specification. The surfaces are generally planar, and the gas transmitting bars of which they are a part are constructed in a manner similar to that described above in connection with FIG. 14. This includes capillary passages of a shape, size and orientation similar to the capillary passages indicated in FIG. 14, as well as capillary openings of an arrangement and location similar to the openings shown in FIG. 14.

Method of Fabrication Of Gas Bars

FIGS. 17 through 24 illustrate two methods of fabricating gas bars for use in the apparatus of this invention designed for the oxygenation of sewage in the form either of so-called "mixed liquor" having about 1 per cent suspended solids or aerobic digester sludge having about 6 per cent suspended solids.

FIG. 17A is a plan view of thin bottom support plate 188, which is rectangular in over-all shape and has a generally rectangular opening 200 in the interior portion thereof to provide an elongated O-shaped member. This member has two inner side walls 202 that are adapted to form a part of the interior wall of gas plenum 160, and two outer side walls 204 adapted to form a part of the exterior wall of the gas plenum.

As shown in FIG. 17B, the first step of this method of fabricating gas bar 166a is to position a plurality of hollow capillary strands 206 and a supply of binder 162 across the top face of thin support plate 188 so that the hollow strands are aligned substantially normal to side walls 202 and 204. In this position, the strands extend beyond plate 188 on both the inner and outer sides of the plate.

The binder applied in this first step may be already present upon the fiber glass as received from the manufacturer of the hollow capillary strands, or it may be added by the fabricator of the gas bar either before or after the strands are positioned across bottom support plate 188. When desired, additional binder may be added to the hollow capillary strands in position upon plate 188, before thin top support plate 190, similar in all respects to bottom support plate 188, is added (FIG. 18C) to produce the "sandwich" of two plates with hollow capillary strands and binder between them.

This sandwich is compressed to cause binder 162 to fill all the crevices between strands 206 and between the strands and support plates 188 and 190. The sandwich is then held compressed until the binder is hardened to embed the hollow capillary strands in the hardened binder as a matrix. Binder 162 may if desired be a heat curable binder, and in that case heat is applied while the sandwich is compressed, to cure the binder.

In the next step of this method of fabricating gas bars, the portions 208 of hollow capillary strands 206 embedded in matrix 162 that extend outwardly beyond exterior side walls 204 of support plates 188 and 190 are trimmed back generally to walls 204 to form gas diffusing surfaces 146 and 148. The surface of the exterior side wall of the gas bar that is comprised of a first wall 204, a plurality of capillary openings 154 surrounded by epoxy 162, and a second wall 204 is preferably made as nearly flat as possible, but the extent of minor departures from the desired planar surface will be determined by the cutting tool and trimming method employed.

The portions 210 of hollow capillary strands 206 embedded in matrix 162 that extend inwardly beyond interior side walls 202 of support plates 188 and 190 are severed to form the inlet ends of gas transmitting passages 158. It is not essential that these ends be trimmed back to walls 202, but only that they provide passage for gas to leave gas plenum 160.

Gastight cover plates 212 and 214 are next affixed to the sandwich, on opposite sides thereof, to form gas plenum 160 into which gas can be introduced through inlet opening 184, and out of which gas can flow through hollow capillary strands 158. A layer of binder, in the form of liquid or in the form of a flat sheet of approriate dimensions as desired, can be interposed between bottom support plate 188 and its associated cover plate 212 and between top support plate 190 and its associated cover plate 214. All the elements of the gas bar are held compressed until the binder has hardened, with the additional use of heat if the binder is heat curable.

Chamfers 216 are preferably provided on the outer edges of upper backing plate 214 that lie and adjacent the flow path of the shearing liquid as the liquid flows out from the discharge end of the liquid transmitting slot (in an upward direction in FIGS. 18B, 24B and 24C), when the gas bar is installed in place in bubble shearing apparatus constructed according to this invention. The reason for these chamfers is to avoid the "attachment" of the discharged flow from the shearing liquid transmitting slot to walls 218 of top backing plate 214 that would occur if those walls were not cut away as indicated. Any such flow attachment would tend to cause the shearing liquid jet stream and the fine gas bubbles contained therein to turn the right angled corner that would be presented by the full wall, and thus cause the jet stream to widen out as it entered the body of liquid into which the gas bubbles were being dispersed. Such a widening of the jet stream would reduce the effectiveness of the distribution of fine gas bubbles throughout the liquid into which they were being introduced; it is preferred to keep the jet stream narrow enough, if possible, that its total angle of spread in the initial stages is no more than about 15°.

By use of a special winding fixture, the fabrication steps illustrated in FIGS. 17A and through 17C may be carried out on a number of units at one time. With winding fixture 220 as illustrated in FIG. 19, eight bottom support plates 188 may be secured to the fixture, two on each vertical wall of the fixture, and hollow fiber glass capillary strands 206 wrapped around all eight plates at the same time. With the necesary binder 162 in place, top support plates 190 may be positioned to form eight sandwiches, and the necessary compression and heating steps completed to produce eight separate units such as illustrated in FIG. 17C.

FIG. 20A illustrates the positioning on bottom support plate 188 of a plurality of lengths of roving 221, in much the same manner as individual capillary strands are positioned in FIG. 17B. Each length of roving 221, as seen in the schematic cross-sectional view of FIG. 20B, is formed of a plurality of hollow capillary strands 206. The capillary strands in substantially all said lengths of roving 221 are generally parallel to each other.

FIGS. 21A through 24C illustrate another type of gas bar 166b, which is fabricated in a manner very similar to the methods of fabicating gas bar 166a aready described. Hollow fiber glass capillary strands 206 and a quantity of binder 162 are sandwiched between bottom plate 192a–192b and top plate 194a–194b, and the necessary compressing and curing steps are carried out. Outer portions 222 of capillary strands 206 embedded in binder 162 are trimmed back to form a gas diffusing surface, and inner portions 224 of the strands and binder are severed. In addition, support plates 192 and 194 are severed along lines 226 to form two separate sandwiches, each with a single gas diffusing surface 148.

Bottom cover plate 228 has a groove 230 adapted to receive an assembled sandwich of capillary strands and binder between two support plates. Cover plate 228 has a second groove 232 surrounded by an elongated C-shaped wall 234. The cross sectional views of FIGS. 22B and 22C, and the end view of FIG. 22D (taken from the bottom of FIG. 22A), show the general configuration of cover plate 228.

Top cover plate 236, as is seen from the plan view of FIGS. 23A and the end view of FIG. 23C (taken from the bottom of FIG. 23A), has a flat planar surface. When top cover plate 236 is placed upon bottom cover plate 228, the assembled plates perform two functions. First, they secure between them the sandwich of two support plates on each side of a layer of hollow capillary strands embedded in binder as a matrix (FIGS. 24B and 24C). Second, between them they define gas plenum 160 surrounded on three sides by wall 234 (FIG. 22C) and on the fourth side by the sandwich (FIG. 24B). Binder layers 238 and 240 complete the gastight assemblage of gas bar 166b.

THE METHOD OF THIS INVENTION

The method of this invention involves the same substantially parallel laminar flow with a partially developed laminar boundary layer over very small capillary openings preferably located in close proximity to the leading edge of a gas diffusing surface, any remaining portion of the capillary openings on the surface being free of any type of flow but fully developed laminar flow, that has been described above. The method is not limited to the particular configuration of elements, including a shearing liquid transmitting slot, that comprises the apparatus of this invention. However, it is limited to the establishment of a partially developed laminar boundary layer over at least about one-quarter of the capillary openings of the gas diffusing surface, in order that the layer can have a significant effect on the bubble formation resulting from use of the method.

In the method of the present invention, gas is flowed through a gas diffusing surface with capillary openings substantially all of which have a diameter no larger than about 100 microns, and a shearing liquid is flowed past a leading edge of the gas diffusing surface and over that surface to a discharge edge thereof. The flow is carried out with minimal perturbation, and at a velocity to produce the substantially parallel laminar flow that is characteristic of this invention, including a partially developed laminar boundary layer over at least about the first quarter of the capillary openings in the gas diffusing surface measured from the leading edge of the gas diffusing surface. Best results are obtained if the partially developed layer extends over a majority of the capillary openings measured from the leading edge.

The method is preferably carried out with the capillary openings located immediately adjacent the leading edge of the gas diffusing surface. Good results are obtained with this method if the capillary openings most remote from the leading edge are located no more than about 1 inch from that edge. Improved results are obtained if that distance is no more than about 0.5 inch, and best results if it is no more than about 0.1 inch, 0.05 inch, or even less.

The method provides the best bubble shearing if the gas diffusing surface is generally planar. The size of the sheared bubbles is smaller the larger the contact angle of the shearing liquid is with the material that is selected to define or surround the capillary openings in the gas diffusing surface. That contact angle is preferably at least about 60° when the shearing liquid used is tap water.

Satisfactory bubble shearing results are obtained with the method of this invention with a shearing liquid velocity of about 10 feet per second when water is employed as the shearing liquid. Improved results are obtained with a shearing liquid velocity of about 15 feet per second, and still more improvement is achieved if the method employs a shearing liquid velocity of about 20 feet per second. A velocity of at least about 25 feet per second is preferred.

Use of this method with gas being supplied to the gas transmitting passages at a rate to produce a gas flow through the passages of about 10 standard cubic feet per minute per square foot of diffusing surface will ordinarily produce good bubble shearing results. As already explained above, increasing the gas flow rate affects bubble shearing in ways known to those skilled in the art, but generally speaking a gas flow rate of 40 standard cubic feet per minute per square foot of active diffusing area gives improved results, and increasing this figure to 70 or somewhat more gives still better results.

As the shearing liquid flows away from the discharge edge of the gas diffusing surface it carries with it, and into the body of liquid being treated, the many small gas bubbles sheared off the gas diffusing surface by the moving shearing liquid.

The presence of the hydrodynamic characteristics that characterize the method of this invention can be determined in the same manner as explained above in the description of the apparatus of the invention. The shearing liquid may be translucent or transparent, as for example water, if desired.

Effect Of Various Parameters On Fine Bubble Formation

In the above description of the method and apparatus of this invention, a number of factors have been discussed that determine the effectiveness of bubble shearing in achieving gas bubbles of the smallest possible size, with as great uniformity of size as possible, and at the lowest possible expenditure of energy. There are many other factors affecting the diffusion of gas bubbles into a body of liquid, some of which can be varied and some of which are fixed, but all of which should be taken into account in the practice of the present invention.

The parameters which are ordinarily fixed in any process involving diffusion of gas into a body of liquid include the ambient conditions, the nature of the gas diffused, and the nature of the liquid into which it is diffused.

At least three ambient conditions affect the rate at which gas bubbles can be dissolved into a body of liquid:

1. Ordinarily, the colder the body of liquid, the greater will be the solubility of the gas in the liquid. The viscosity of the liquid may also be increased somewhat by a reduced temperature, which would tend to improve bubble shearing, and thus make smaller bubbles, by increasing the viscous shear force. It may also decrease the rise rate of the gas bubbles and therefore give them a longer period of time in which to be dissolved in the liquid. At the same time, it may decrease the extent to which the gas bubbles can initially be laterally dispersed as a part of a fluid stream directed into the body of liquid. Finally, by increasing the surface tension of the surfaces between the gas bubbles and the liquid, a lower ambient temperature may tend to increase the average bubble size by making shearing more difficult, at the same time that it tends to affect, in the other ways just indicated, the manner in which bubbles are formed and absorbed into the liquid after they are formed. 2. The type of movement in the body of liquid will affect the degree of dispersion of the bubbles throughout the liquid. It may also affect the extent of convective diffusion, i.e., the rate at which fresh liquid is presented to the bubble surface for acceptance of gas by absorption from the bubble. The body of liquid, for example, may be still, it may have a smooth, generally horizontal current, it may have a smooth, generally vertical current, or it may be turbulent. 3. The partial pressure of the gas being dissolved, as measured at the surface of the body of liquid into which the gas is introduced, will affect the rate of absorption by the liquid. The higher the partial pressure, the more rapidly the diffused gas will be absorbed into the liquid.

A number of factors affecting the rate of absorption of the gas will be determined by the particular liquid and gas that are utilized in the process in question. These include:

1. The solubility of the gas in the liquid.

2. The rate of diffusion of the gas into the liquid through the surface of a bubble of a given size in a still body of the liquid.

3. The characteristic surface tension at surfaces between the gas and the liquid, including the effect of any surfactants or other contaminants present.

4. The pressure exerted by the liquid — because of its particular density — at various depths from the feed point of the gas bubbles up to the surface of the body of liquid. This pressure will have an effect, to some degree at least, upon the size of the bubbles as they rise through the body of the liquid.

5. The difference between the specific gravity of the body of liquid and the gas. The greater this difference, the greater will be the rise rate of the gas bubbles.

6. The viscosity of liquid in the body of liquid into which the bubbles are diffused. The greater the viscosity, the slower the rise rate of the bubbles, but also the more limited is the initial lateral dispersion of the bubbles through the body of liquid.

7. The ultimate shape of the bubbles, which may be substantially spherical, or somewhat flattened, in form.

8. With every set of circumstances, there will be a different tendency on the part of bubbles of a particular gas in a particular liquid to couple or coalesce if the bubbles have non-uniform terminal rise rates and therefore tend to collide.

The factors that can be varied in bubble shearing apparatus, several of which have been discussed above, include at least the following:

1. The size, shape and orientation of the gas-transmitting capillary openings all affect the size and uniformity of the gas bubbles formed.

2. The initial shape of the bubble immediately after formation — as affected by the shape of the orifice from which it is discharged, the type of movement in the body of liquid being treated, etc. — affects its rate of absorption into the liquid. (This factor is usually of minor importance, because the shape of the bubble changes relatively rapidly from its initial form.)

3. The size, shape and orientation of the liquid-transmitting passage affects the size and uniformity of the resulting gas bubbles.

4. The size, shape and direction of flow of the stream of shearing liquid affects the degree of initial dispersion (especially lateral dispersion) of gas bubbles through the body of liquid.

The process conditions that may be varied to influence the rate of absorption of gas bubbles by a body of liquid in which they are diffused include at least the following:

1. The depth of the feed point of the gas bubbles determines the length of travel the bubbles are permitted before they must be fully dissolved in the body of liquid in order not to break the surface of the liquid and escape.

2. The velocity with which the gas is caused to flow through the capillary passages of the foraminous gas transmitting material affects the rate at which gas bubbles are introduced into the body of liquid.

3. The velocity with which the shearing liquid is caused to flow past the capillary openings of the gas transmitting foraminous material affects principally the size of the resulting bubbles, but may also affect the uniformity of those bubbles.

Many of the above factors are interrelated, both in ways that have been indicated above in this specification and in other ways. A person skilled in the art who applies the teaching of this disclosure will, of course, take into consideration in the practice of this invention all pertinent factors that may affect his attempt to achieve rapid absorption of diffused gas bubbles into a body of liquid.

The above detailed description of this invention has been given for clarity of understanding only. No unnecessary limitations should be understood therefrom, as modifications will be obvious to those skilled in the art.

I claim:

1. Bubble shearing apparatus for diffusing fine gas bubbles into a body of liquid which comprises:

a gas transmitting body having a plurality of gas transmitting passages extending therethrough, each of said passages terminating in a capillary opening at a gas diffusing surface of said body, substantially all said capillary openings having a diameter of no more than about 100 microns;

means for providing a flow of gas through said gas transmitting passages and out said plurality of capillary openings to form nascent gas bubbles;

a slot-defining member spaced from said gas diffusing surface to form with said surface a shearing liquid transmitting slot having an inlet end, and a discharge end out of which shearing liquid may be discharged into said body of liquid, the shape, dimensions and spacing of said gas transmitting body and said slot-defining member being adapted, when water at 20°C. flowing through said slot with a mean entrance velocity of 10 feet per second is employed as the shearing liquid and no gas is flowing through said gas transmitting passages, to establish laminar flow in said water that is substantially parallel to the contour of said gas diffusing surface, including a partially developed laminar boundary layer immediately adjacent said gas diffusing surface with a free stream above said layer over at least a substantial portion of said capillary openings, the water over any remaining portion of said capillary openings being substantially free of any type of flow other than fully developed substantially parallel laminar flow; and means for providing a flow of liquid through said slot at a velocity to produce in water substantially parallel laminar flow as described above, to shear said nascent gas bubbles from said capillary openings as the liquid in said flow that is in contact with said gas diffusing surface moves past said openings, the flow of liquid through said slot carrying said sheared gas bubbles out of said slot at its discharge end and into said body of liquid.

2. Bubble shearing apparatus for diffusing fine gas bubbles into a body of liquid which comprises:

a gas transmitting body having a plurality of gas transmitting passages extending therethrough, each of said passages terminating in a capillary opening at a gas diffusing surface of said body, substantially all said capillary openings having a diameter of no more than about 100 microns;

means for providing a flow of gas through said gas transmitting passages and out said plurality of capillary openings to form nascent gas bubbles;

a slot-defining member spaced from said gas diffusing surface to form with said surface a shearing liquid transmitting slot having an inlet end, and a discharge end out of which shearing liquid may be discharged into said body of liquid, the shape, dimensions and spacing of said gas transmitting body and said slot-defining member being adapted, when water at 20°C. flowing through said slot with a mean entrance velocity of 15 feet per second is employed as the shearing liquid and no gas is flowing through said gas transmitting passages, to establish laminar flow in said water that is substantially parallel to the contour of said gas diffusing surface, including a partially developed laminar boundary layer immediately adjacent said gas diffusing surface with a free stream above said layer over at least a substantial portion of said capillary openings, the water over any remaining portion of said capillary openings being substantially free of any type of flow other than fully developed substantially parallel laminar flow; and means for providing a flow of liquid through said slot at a velocity to produce in water substantially parallel laminar flow as described above, to shear said nascent gas bubbles from said capillary openings as the liquid in said flow that is in contact with said gas diffusing surface moves past said openings, the flow of liquid through said slot carrying said sheared gas bubbles out of said slot at its discharge end and into said body of liquid.

3. The apparatus of claim 2 which is adapted to continue to produce substantially parallel laminar flow as described when said mean entrance water velocity is 20 feet per second.

4. The apparatus of claim 2 which is adapted to continue to produce substantially parallel laminar flow as described when said mean entrance water velocity is 25 feet per second.

5. The apparatus of claim 2 in which the shape, dimensions and spacing of said gas transmitting body and said slot-defining member are adapted to establish, when water is employed as the shearing liquid under the conditions specified, a partially developed laminar boundary layer immediately adjacent said gas diffusing surface, with a free stream above said layer, that extends downstream beyond all capillary openings in said gas diffusing surface, and in which said last mentioned means provides a flow of liquid through said slot at a velocity to produce in water substantially parallel laminar flow as described.

6. The apparatus of claim 5 in which the shape, dimensions and spacing of said gas transmitting body and said slot-defining member are adapted to establish, when water is employed as the shearing liquid under the conditions specified, a partially developed laminar boundary layer immediately adjacent said gas diffusing surface that becomes fully developed laminar flow in a zone lying between all said capillary openings and the discharge end of said liquid transmitting slot, the gas diffusing surface beneath said fully developed laminar flow being free of any capillary openings, and in which said last mentioned means provides a flow of liquid through said slot at a velocity to produce in water substantially parallel laminar flow as described.

7. The apparatus of claim 5 in which the shape, dimensions and spacing of said gas transmitting body and said slot-defining member are adapted to establish, when water is employed as the shearing liquid under the conditions specified, a partially developed laminar boundary layer immediately adjacent said gas diffusing surface, with a free stream above said layer, that extends at least to the discharge end of said liquid transmitting slot, and in which said last mentioned means provides a flow of liquid through said slot at a velocity to produce in water substantially parallel laminar flow as described.

8. The apparatus of claim 7 in which the shape, dimensions and spacing of said gas transmitting body and said slot-defining member are adapted to establish, when water is employed as the shearing liquid under the conditions specified, substantially parallel laminar liquid flow in which free stream flow of said water extends downstream beyond the discharge end of said liquid transmitting slot and into said body of liquid, and in which said last mentioned means provides a flow of liquid through said slot at a velocity to produce in water substantially parallel laminar flow as described.

9. The apparatus of claim 2 in which said gas diffusing surface contains other capillary openings downstream of said first mentioned capillary openings, and in which the shape, dimensions and spacing of said gas transmitting body and said slot-defining member are adapted to establish in addition, when water is employed as the shearing liquid under the conditions specified, liquid flow that includes a fully developed laminar flow over at least some of said other capillary openings in the downstream portion of said gas diffusing surface, and in which said last mentioned means provides a flow of liquid through said slot at a velocity to produce in water substantially parallel laminar flow as described.

10. The apparatus of claim 2 in which the shape, dimensions and spacing of said gas transmitting body and said slot-defining member are adapted to establish, when water is employed as the shearing liquid under the conditions specified, a partially developed laminar boundary layer immediately adjacent said gas diffusing surface, with a free stream above said layer, that terminates in a turbulent zone adjacent the discharge end of said liquid transmitting slot and within said slot, the gas diffusing surface beneath said turbulent zone being free of any capillary openings, and in which said last mentioned means provides a flow of liquid through said slot at a velocity to produce in water substantially parallel laminar flow followed by turbulence as described.

11. The apparatus of claim 2 in which the shape, dimensions and spacing of said gas transmitting body and said slot-defining member are adapted to produce, when water is employed as the shearing liquid under the conditions specified, substantially parallel laminar flow of liquid through said liquid transmitting slot that is effective to shear at least some of said nascent gas bubbles from said capillary openings in the gas diffusing surface by the combined action of the liquid moving in said partially developed laminar boundary layer and the liquid moving in the free stream above said boundary layer, and in which said last mentioned means provides a flow of liquid through said slot at a velocity to produce in water substantially parallel laminar flow as described.

12. The apparatus of claim 11 in which the shape, dimensions and spacing of said gas transmitting body and said slot-defining member are adapted to produce, when water is employed as the shearing liquid under the conditions specified, substantially parallel laminar flow of liquid through said liquid transmitting slot that is effective to shear all said nascent gas bubbles from said capillary openings in the gas diffusing surface by the combined action of the liquid moving in said partially developed laminar boundary layer and the liquid moving in the free stream above said boundary layer, and in which said last mentioned means provides a flow of liquid through said slot at a velocity to produce in water substantially parallel laminar flow as described.

13. The apparatus of claim 2 in which the shape, dimensions and spacing of said gas transmitting body and said slot-defining member are adapted to produce, when water is employed as the shearing liquid under the conditions specified, substantially parallel laminar flow of liquid through said liquid transmitting slot that is effective to shear at least some of said nascent gas bubbles from said capillary openings in the gas diffusing surface solely by the action of the liquid moving in said partially developed laminar boundary layer, and in which said last mentioned means provides a flow of liquid through said slot at a velocity to produce in water substantially parallel laminar flow as described.

14. The apparatus of claim 13 in which the shape, dimensions and spacing of said gas transmitting body and said slot-defining member are adapted to produce, when water is employed as the shearing liquid under the conditions specified, substantially parallel laminar flow of liquid through said liquid transmitting slot that is effective to shear all said nascent gas bubbles from said capillary openings in the gas diffusing surface solely by the action of the liquid moving in said partially developed laminar boundary layer, and in which said last mentioned means provides a flow of liquid through said slot at a velocity to produce in water substantially parallel laminar flow as described.

15. The apparatus of claim 2 in which the shape, dimensions and spacing of said gas transmitting body and said slot-defining member are adapted to produce, when water is employed as the shearing liquid under the conditions specified, substantially parallel laminar flow of liquid through said liquid transmitting slot that is effective to shear some of said nascent gas bubbles from said capillary openings in the gas diffusing surface solely by the action of the liquid moving in said partially developed laminar boundary layer and some of said nascent gas bubbles solely by the action of the liquid moving in said fully developed laminar flow, and in which said last mentioned means provides a flow of liquid through said slot at a velocity to produce in water substantially parallel laminar flow as described.

16. The apparatus of claim 2 which is adapted to continue to produce substantially parallel laminar flow as described when gas is supplied to said gas transmitting passages to produce a flow rate of 10 standard cubic feet per minute per square foot of active area in said gas diffusing surface.

17. The apparatus of claim 2 which is adapted to continue to produce substantially parallel laminar flow as described when gas is supplied to said gas transmitting passages to produce a flow rate of 40 standard cubic feet per minute per square foot of active area in said gas diffusing surface.

18. The apparatus of claim 2 which is adapted to continue to produce substantially parallel laminar flow as described when gas is supplied to said gas transmitting passages to produce a flow rate of 70 standard cubic feet per minute per square foot of active area in said gas diffusing surface.

19. The apparatus of claim 2 in which the farthest upstream of said capillary openings in the gas diffusing surface of said gas transmitting body lie as near the inlet end of said liquid transmitting slot as is structurally practicable.

20. The apparatus of claim 2 in which the relative positions of said gas transmitting body and said slot-defining member are adjustable to vary the width of said liquid transmitting slot through a predetermined range, and in which the shape, dimensions and spacing of said gas transmitting body and said slot-defining member are adapted to establish, when water is employed as the shearing liquid under the conditions specified, substantially parallel laminar flow as described for at least a portion of said range of slot widths.

21. The apparatus of claim 2 in which said slot-defining member has a plurality of gas transmitting passages therethrough, each of which terminates in a capillary opening at the surface of said slot-defining member, said latter capillary openings having substantially the same shape, size, and location in said liquid transmitting slot as said capillary openings in said first mentioned gas transmitting body.

22. The apparatus of claim 2 which is adapted to diffuse into said body of liquid gas bubbles of a predetermined maximum diameter, and in which each of said capillary openings in said gas diffusing surface is surrounded by a minimum land area elliptical in shape that extends on each side of said opening in the direction perpendicular to the direction of liquid flow through said liquid transmitting slot by a distance at least about equal to said maximum bubble diameter, and on each side of said opening in the direction of liquid flow by a distance equal to at least about three times said maximum bubble diameter.

23. The apparatus of claim 2 which is adapted to diffuse into said body of liquid gas bubbles of a predetermined maximum diameter and in which the maximum diameter of said capillary openings is no more than about one-half said maximum bubble diameter.

24. The apparatus of claim 2 in which the distance separating the inlet end of said liquid transmitting slot from the farthest downstream of said capillary openings is no more than about 1 inch.

25. The apparatus of claim 2 in which the distance separating the inlet end of said liquid transmitting slot from the farthest downstream of said capillary openings is no more than about 0.5 inch.

26. The apparatus of claim 2 in which the distance separating the inlet end of said liquid transmitting slot from the farthest downstream of said capillary openings is no more than about 0.1 inch.

27. The apparatus of claim 2 in which the distance separating the inlet end of said liquid transmitting slot from the farthest downstream of said capillary openings is no more than about 0.05 inch.

28. The apparatus of claim 2 which includes a plurality of said liquid transmitting slots which are substantially vertical in orientation and are disposed substantially parallel to each other.

29. The apparatus of claim 2 in which the longitudinal axis of each of said gas transmitting passages adjacent its respective capillary opening extends substantially perpendicular to the plane tangent to said gas diffusing surface.

30. The apparatus of claim 2 in which said plurality of gas transmitting passages is defined by a plurality of discrete tubes embedded in said gas transmitting body as a matrix.

31. The apparatus of claim 2 in which said gas diffusing surface is generally planar.

32. The apparatus of claim 2 in which the portions of said gas diffusing surface surrounding said capillary openings are formed of a material having a contact angle with tap water of at least about 60°.

33. Bubble shearing apparatus for diffusing fine gas bubbles into a body of liquid which comprises:
   a gas transmitting body having a plurality of gas transmitting passages extending therethrough, each of said passages terminating in a capillary opening at a gas diffusing surface of said body, substantially all said capillary openings having a diameter of no more than about 100 microns;
   means for providing a flow of gas through said gas transmitting passages and out said plurality of capillary openings to form nascent gas bubbles;
   a slot-defining member spaced from said gas diffusing surface to form with said surface a shearing liquid transmitting slot having an inlet end, and a discharge end out of which shearing liquid may be discharged into said body of liquid, the product of (a) the distance separating said inlet end from the farthest downstream of all said capillary openings, times (b) the average width of said liquid transmitting slot throughout said distance being no more than about 0.1 square inches; and
   means for providing a flow of liquid through said slot to shear said nascent gas bubbles from said capillary openings as the liquid in said flow that is in contact with said gas diffusing surface moves past said openings, the flow of liquid through said slot carrying said sheared gas bubbles out of said slot at its discharge end and into said body of liquid.

34. The apparatus of claim 33 in which said product is no more than about 0.075 square inches.

35. The apparatus of claim 33 in which said product is no more than about 0.05 square inches.

36. The apparatus of claim 33 in which said product is no more than about 0.025 square inches.

37. The apparatus of claim 33 in which said product is no more than about 0.01 square inches.

38. The apparatus of claim 33 in which said product is no more than about 0.005 square inches.

39. The apparatus of claim 33 in which the farthest upstream of said capillary openings in the gas diffusing surface of said gas transmitting body lie as near the inlet end of said liquid transmitting slot as is structurally practicable.

40. The apparatus of claim 39 in which the length of said shearing liquid transmitting slot from its inlet end to its discharge end is no more than about 0.080 inches.

41. The apparatus of claim 33 in which the relative positions of said gas transmitting body and said slot-defining member are adjustable to vary the width of said liquid transmitting slot through a predetermined range, and in which said product is no more than about 0.1 square inches for at least a portion of said range of slot widths.

42. The apparatus of claim 41 in which the width of said slot may be varied from about zero to a predetermined maximum width.

43. The apparatus of claim 33 in which the portions of said gas transmitting body and slot-defining member that define the inlet end of said liquid transmitting slot have rounded edges.

44. The apparatus of claim 33 in which said liquid transmitting slot throughout its length has a substantially uniform width measured perpendicular to the direction of flow therethrough.

45. The apparatus of claim 33 in which said liquid transmitting slot has a substantially rectangular transverse cross section throughout its length.

46. The apparatus of claim 33 in which the liquid flow through said liquid transmitting slot follows a substantially straight, unimpeded path.

47. The apparatus of claim 46 in which said gas diffusing surface and the surface of said slot-defining means that between them form said liquid transmitting slot are substantially planar and parallel to each other from the inlet end to the discharge end of said slot.

48. The apparatus of claim 46 in which said gas diffusing surface and the surface of said slot-defining means that between them form said liquid transmitting slot are concentric, substantially right circular cylinders of different diameters, so that they bound a space having an annular transverse cross section of substantially uniform width throughout the length of said slot.

49. The apparatus of claim 33 in which the width of said shearing liquid transmitting slot throughout its length is no more than about 0.125 inches.

50. The apparatus of claim 33 in which the width of said shearing liquid transmitting slot throughout its length is no more than about 0.040 inches.

51. The apparatus of claim 33 in which the width of said shearing liquid transmitting slot throughout its length is no more than about 0.020 inches.

52. The apparatus of claim 33 in which said slot-defining member has a plurality of gas transmitting passages extending therethrough, each of which terminates in a capillary opening at the surface of said slot-defining member, said latter capillary openings having substantially the same shape, size and location within said liquid transmitting slot as said capillary openings in said first mentioned gas transmitting body.

53. The apparatus of claim 33 which includes a plurality of said liquid transmitting slots which are substantially vertical in orientation and are disposed substantially parallel to each other.

54. The apparatus of claim 33 in which the longitudinal axis of each of said gas transmitting passages adjacent its respective capillary opening extends substantially perpendicular to the plane tangent to said gas diffusing surface.

55. The apparatus of claim 33 in which said gas diffusing surface is generally planar.

56. The apparatus of claim 33 in which the portions of said gas diffusing surface surrounding said capillary openings are formed of a material having a contact angle with tap water of at least about 60°.

57. The apparatus of claim 33 which is adapted to diffuse into said body of liquid gas bubbles of a predetermined maximum diameter and in which the maximum diameter of said capillary openings is no more than about equal to said maximum bubble diameter.

58. The apparatus of claim 33 which is adapted to diffuse into said body of liquid gas bubbles of a predetermined maximum diameter and in which the maximum diameter of each of said capillary openings is no more than approximately one-half said maximum bubble diameter.

59. The apparatus of claim 33 which is adapted to diffuse into said body of liquid gas bubbles of a predetermined maximum diameter and in which the maximum diameter of each of said capillary openings is no more than approximately one-fourth said maximum bubble diameter.

60. The apparatus of claim 33 in which substantially all said capillary openings have a diameter no larger than about 50 microns.

61. The apparatus of claim 33 in which substantially all said capillary openings have a diameter no larger than about 25 microns.

62. The apparatus of claim 33 in which substantially all said capillary openings have a diameter no larger than about 5 microns.

63. The apparatus of claim 33 in which each of said gas transmitting passages provides a straight, unimpeded path for gas flow through said gas transmitting body.

64. The apparatus of claim 63 in which each of said gas transmitting passages has a cross section of substantially uniform size and shape throughout its length.

65. The apparatus of claim 63 in which each of said gas transmitting passages is substantially a right cylinder in shape.

66. The apparatus of claim 65 in which each of said gas transmitting passages is substantially a right circular cylinder in shape.

67. The apparatus of claim 63 in which said plurality of gas transmitting passages is defined by a plurality of discrete tubes embedded in said gas transmitting body as a matrix.

68. The apparatus of claim 33 in which there is at least one row of said capillary openings in the gas diffusing surface of said gas transmitting body, said row being substantially perpendicular to the flow of liquid through said liquid transmitting slot.

69. The apparatus of claim 68 in which said row of capillary openings is a substantially straight row.

70. The apparatus of claim 68 in which there is a plurality of rows of said capillary openings in the gas diffusing surface of said gas transmitting body, said rows being substantially perpendicular to the flow of liquid through said liquid transmitting slot.

71. The apparatus of claim 33 in which said capillary openings are randomly located across the gas diffusing surface of said gas transmitting body.

72. The apparatus of claim 33 which is adapted to diffuse into said body of liquid gas bubbles of a predetermined maximum diameter and in which each one of said capillary openings in said gas diffusing surface is surrounded by a minimum land area on all sides that is sufficiently extensive in a plane generally tangent to the outermost points on said gas diffusing surface to substantially avoid coalescence or collision of a gas bubble formed at said one opening with a bubble formed at any one of the other of said openings to produce a bubble having a diameter larger than said predetermined maximum diameter.

73. The apparatus of claim 33 which is adapted to diffuse into said body of liquid gas bubbles of a predetermined maximum diameter and in which each of said capillary openings in said gas diffusing surface is surrounded by a minimum land area elliptical in shape that extends on each side of said opening in the direction perpendicular to the direction of liquid flow through said liquid transmitting slot by a distance at least equal to said maximum bubble diameter, measured in a plane generally tangent to the outermost points on said gas diffusing surface.

74. The apparatus of claim 33 which is adapted to diffuse into said body of liquid gas bubbles of a predetermined maximum diameter and in which each of said capillary openings in said gas diffusing surface is surrounded by a minimum land area elliptical in shape that extends on each side of said opening in the direction of liquid flow by a distance equal to at least about three times said maximum bubble diameter, measured in a plane generally tangent to the outermost points on said gas diffusing surface.

75. The apparatus of claim 33 in which said plurality of capillary openings on the gas diffusing surface includes an average of at least about five capillary openings, measured in the direction of flow through said liquid transmitting slot, distributed across substantially all portions of said surface.

76. The apparatus of claim 33 in which said plurality of capillary openings on the gas diffusing surface includes an average of at least about ten capillary openings, measured in the direction of flow through said liquid transmitting slot, distributed across substantially all portions of said surface.

77. The apparatus of claim 33 in which the distance separating the inlet end of said liquid transmitting slot from the farthest downstream of said capillary openings is no more than about 1 inch.

78. The apparatus of claim 33 in which the distance separating the inlet end of said liquid transmitting slot from the farthest downstream of said capillary openings is no more than about 0.5 inch.

79. The apparatus of claim 33 in which the distance separating the inlet end of said liquid transmitting slot from the farthest downstream of said capillary openings is no more than about 0.1 inch.

80. The apparatus of claim 33 in which the distance separating the inlet end of said liquid transmitting slot from the farthest downstream of said capillary openings is no more than about 0.05 inch.

81. Apparatus for diffusing into a body of liquid fine gas bubbles of a predetermined maximum diameter which comprises:

a gas transmitting body having a plurality of gas transmitting passages extending therethrough, each of said passages terminating in a capillary opening at a gas diffusing surface of said body, the maximum diameter of said capillary openings being equal to no more than about said predetermined maximum bubble diameter and in any event no more than about 100 microns, each one of said capillary openings being surrounded by a minimum land area on all sides that is sufficiently extensive in a plane generally tangent to the outermost points on said gas diffusing surface to minimize coalescence or collision of a gas bubble formed at said one opening with a bubble formed at any one of the other of said openings to produce a bubble having a diameter larger than said predetermined maximum diameter;

means for providing a flow of gas through said gas transmitting passages and out said plurality of capillary openings to form nascent gas bubbles;

a slot-defining member spaced from said gas diffusing surface to form with said surface a liquid transmitting slot having an inlet end, and a discharge end out of which liquid may be discharged into said body of liquid, substantially all said capillary openings in the gas diffusing surface of the gas transmitting body being located no more than about 1 inch from the inlet end of said liquid transmitting slot, the product of (a) the distance separating said inlet end from the farthest downstream of said capillary openings, times (b) the average width of said liquid transmitting slot throughout said distance being no more than about 0.1 square inches; and means for providing a flow of liquid through said slot to shear said nascent gas bubbles from said capillary openings as the liquid in said flow that is in contact with said gas diffusing surface moves past said openings, the flow of liquid through said slot carrying said sheared gas bubbles out of said slot at its discharge end and into said body of liquid.

82. Apparatus for diffusing into a body of liquid fine gas bubbles of a predetermined maximum diameter which comprises:

a gas transmitting body having a plurality of gas transmitting passages extending therethrough, each of said passages providing a straight, unimpeded path for gas flow therethrough, having a cross section of substantially uniform size and shape throughout its length, and terminating in a capillary opening at a gas diffusing surface of said body, the longitudinal axis of each of said gas transmitting passages adjacent its respective capillary opening extending substantially perpendicular to the median plane of said gas diffusing surface, the maximum diameter of said capillary openings being no more than about said predetermined maximum bubble diameter and in any event no more than about 100 microns, said surface having an average of at least five capillary openings therein measured in the direction of flow in said liquid transmitting slot, each one of said capillary openings being surrounded by a minimum land area on all sides that is sufficiently extensive in a plane generally tangent to the outermost points on said gas diffusing surface to minimize coalescence or collision of a gas bubble formed at said one opening with a bubble formed at any one of the other of said openings to produce a bubble having a diameter larger than said predetermined maximum diameter;

means for providing a flow of gas through said gas transmitting passages and out said plurality of capillary openings to form nascent gas bubbles;

a slot-defining member spaced from said gas diffusing surface to form with said surface a liquid transmitting slot having an inlet end, a substantially rectangular transverse cross section of uniform width throughout its length, a substantially straight unimpeded flow path therethrough, and a discharge end out of which liquid may be discharged into said body of liquid, substantially all said capillary openings in the gas diffusing surface of the gas transmitting body being located no more than about 0.5 inch from the inlet end of said liquid transmitting slot, the product of (a) the distance separating said inlet end from the farthest downstream of said capillary openings, times (b) the average width of said liquid transmitting slot throughout said distance being no more than about 0.05 square inches, said slot-defining member also having a plurality of gas transmitting passages extending therethrough, each of which terminates in a capillary opening at the surface of said slot-defining member, said latter capillary openings having substantially the same shape, size, and location within said liquid transmitting slot as said capillary openings in said first mentioned gas transmitting body; and means for providing a flow of liquid through said slot to shear said nascent gas bubbles from said capillary openings as the liquid in said flow that is in contact with said gas diffusing surface moves past said openings, the flow of liquid through said slot carrying said sheared gas bubbles out of said slot at its discharge end and into said body of liquid.

83. Apparatus for diffusing into a body of liquid fine gas bubbles of a predetermined maximum diameter which comprises:

a gas transmitting body having a plurality of gas transmitting passages extending therethrough, each of said passages being substantially a right cylinder in shape and terminating in a capillary opening at a gas diffusing surface of said body, said gas diffusing surface being generally planar, the longitudinal axis of each of said gas transmitting passages adjacent its respective capillary opening extending substantially perpendicular to the median plane of said gas diffusing surface, the maximum diameter of said capillary openings being no more than about said predetermined maximum bubble diameter and in any event no more than about 50 microns, said surface having an average of at least ten capillary openings therein measured in the direction of flow in said liquid transmitting slot, said plurality of gas diffusing passages being defined by a plurality of discrete tubes embedded in said gas transmitting body as a matrix, each one of said capillary openings being surrounded by a minimum land area on all sides that is sufficiently extensive in a plane generally tangent to the outermost points on said gas diffusing surface to minimize coalescence or collision of a gas bubble formed at said one opening with a bubble formed at any one of the other of said openings to produce a bubble having a diameter larger than said predetermined maximum diameter;

means for providing a flow of gas through said gas transmitting passages and out said plurality of capillary openings to form nascent gas bubbles;

a slot-defining member spaced from said gas diffusing surface to form with said surface a liquid transmitting slot, said slot having an inlet end and a discharge end out of which liquid may be discharged into said body of liquid, said gas diffusing surface and the surface of said slot-defining means that between them form said liquid transmitting slot being substantially planar and parallel to each other from the inlet end to the discharge end of said slot, said capillary openings in the gas diffusing surface of the gas transmitting body being located as near to the inlet end of said liquid transmitting slot as is structurally practicable, the product of (a) the distance separating said inlet end from the farthest downstream of said capillary openings, times (b) the average width of said liquid transmitting slot throughout said distance being no more than about 0.01 square inches, said slot-defining member also having a plurality of gas transmitting passages extending therethrough, each of which terminates in a capillary opening at the surface of said slot-defining member, said latter capillary openings having substantially the same shape, size, and location within said liquid transmitting slot as said capillary openings in said first mentioned gas transmitting body; and means for providing a flow of liquid through said slot to shear said nascent gas bubbles from said capillary openings as the liquid in said laminar flow that is in contact with said gas diffusing surface moves past said openings, the flow of liquid through said slot carrying said sheared gas bubbles out of said slot at its discharge end and into said body of liquid.

84. Bubble shearing apparatus for diffusing fine gas bubbles into a body of liquid which comprises:
a gas transmitting body having a plurality of gas transmitting passages extending therethrough, each of said passages terminating in a capillary opening at a gas diffusing surface of said body, substantially all said capillary openings having a diameter of no more than about 100 microns;
means for providing a flow of gas through said gas transmitting passages and out said plurality of capillary openings to form nascent gas bubbles;
a slot-defining member spaced from said gas diffusing surface to form with said surface a shearing liquid transmitting slot having an inlet end, and a discharge end out of which shearing liquid may be discharged into said body of liquid, the distance separating the inlet end of said liquid transmitting slot from the farthest downstream of said capillary openings being no more than about 1 inch; and
means for providing a flow of liquid through said slot to shear said nascent gas bubbles from said capillary openings as the liquid in said flow that is in contact with said gas diffusing surface moves past said openings, the flow of liquid through said slot carrying said sheared gas bubbles out of said slot at its discharge end and into said body of liquid.

85. The apparatus of claim 84 in which said distance is no more than about 0.5 inch.

86. The apparatus of claim 84 in which said distance is no more than about 0.1 inch.

87. The apparatus of claim 84 in which said distance is no more than about 0.05 inch.

88. A method of diffusing fine gas bubbles into a body of liquid which comprises:
flowing gas through a plurality of gas transmitting capillary passages in a gas transmitting body, and out of the capillary openings in which said passages terminate, at a gas diffusing surface of said body, substantially all said capillary openings having a diameter of no more than about 100 microns;
flowing a liquid in which nascent gas bubbles may form past a leading edge of and over said gas diffusing surface to a discharge edge thereof with minimal perturbation and at a velocity to produce laminar flow in said liquid that is substantially parallel to the contour of said gas diffusing surface, including a partially developed laminar boundary layer immediately adjacent said gas diffusing surface, with a free stream above said layer, over at least about the first one-quarter of said capillary openings measured from said leading edge, the liquid over any remaining portion of said capillary openings being substantially free of any type of flow other than fully developed substantially parallel laminar flow, to shear said nascent gas bubbles from said capillary openings as the liquid in said laminar flow that is in contact with said gas diffusing surfaces moves past said openings; and
flowing the liquid carrying said sheared gas bubbles away from said gas diffusing surface at said discharge edge thereof and into said body of liquid.

89. A method of diffusing fine gas bubbles into a body of liquid which comprises:
flowing gas through a plurality of gas transmitting capillary passages in a gas transmitting body, and out of the capillary openings in which said passages terminate, at a gas diffusing surface of said body, substantially all said capillary openings having a diameter of no more than about 100 microns;
flowing a liquid in which nascent gas bubbles may form past a leading edge of and over said gas diffusing surface to a discharge edge thereof with minimal perturbation and at a velocity to produce laminar flow in said liquid that is substantially parallel to the contour of said gas diffusing surface, including a partially developed laminar boundary layer immediately adjacent said gas diffusing surface, with a free stream above said layer, over at least a majority of said capillary openings measured from said leading edge, the liquid over any remaining portion of said capillary openings being substantially free of any type of flow other than fully developed substantially parallel laminar flow, to shear said nascent gas bubbles from said capillary openings as the liquid in said laminar flow that is in contact with said gas diffusing surfaces moves past said openings; and
flowing the liquid carrying said sheared gas bubbles away from said gas diffusing surface at said discharge edge thereof and into said body of liquid.

90. The method of claim 89 in which the shearing liquid is at least translucent.

91. The method of claim 90 in which the shearing liquid is transparent.

92. The method of claim 91 in which the shearing liquid is water.

93. The method of claim 89 in which said first liquid flow step establishes a partially developed laminar boundary layer immediately adjacent said gas diffusing surface, with a free stream above said layer, that extends downstream beyond all capillary openings in said gas diffusing surface.

94. The method of claim 93 in which said first liquid flow step establishes a partially developed laminar boundary layer immediately adjacent said gas diffusing surface that becomes fully developed laminar flow in a zone lying between all said capillary openings and said discharge edge of the gas diffusing surface, the gas diffusing surface beneath fully developed laminar flow being free of any capillary openings.

95. The method of claim 93 in which said first liquid flow step establishes a partially developed laminar boundary layer immediately adjacent said gas diffusing surface, with a free stream above said layer, that extends at least to said discharge edge of the gas diffusing surface.

96. The method of claim 95 in which said first liquid flow step establishes substantially parallel laminar flow in which free stream flow of said liquid extends downstream beyond said discharge edge of the gas diffusing surface and into said body of liquid.

97. The method of claim 89 in which said gas diffusing surface contains other capillary openings downstream of said first mentioned capillary openings, and in which said first liquid flow step establishes in addition liquid flow that includes a fully developed laminar flow over at least some of said other capillary openings in the downstream portions of said gas diffusing surface.

98. The method of claim 89 in which said first liquid flow step establishes a partially developed laminar boundary layer immediately adjacent said gas diffusing surface, with a free stream above said layer, that terminates in a turbulent zone adjacent said discharge edge of the gas diffusing surface and above said surface, the gas diffusing surface beneath said turbulent zone being free of any capillary opening.

99. The method of claim 89 in which said first liquid flow step produces substantially parallel laminar flow of liquid that is effective to shear at least some of said nascent gas bubbles from said capillary openings in the gas diffusing surface by the combined action of the liquid moving in said partially developed laminar boundary layer and the liquid moving in the free stream above said boundary layer.

100. The method of claim 99 in which said first liquid flow step produces substantially parallel laminar flow of liquid that is effective to shear all said nascent gas bubbles from said capillary openings in the gas diffusing surface by the combined action of the liquid moving in said partially developed laminar boundary layer and the liquid moving in the free stream above said boundary layer.

101. The method of claim 89 in which said first liquid flow step produces substantially parallel laminar flow of liquid that is effective to shear at least some of said nascent gas bubbles from said capillary openings in the gas diffusing surface solely by the action of the liquid moving in said partially developed laminar boundary layer.

102. The method of claim 101 in which said first liquid flow step produces substantially parallel laminar flow of liquid that is effective to shear all said nascent gas bubbles from said capillary openings in the gas diffusing surface solely by the action of the liquid moving in said partially developed laminar boundary layer.

103. The method of claim 89 in which said first liquid flow step produces substantially parallel laminar flow of liquid that is effective to shear some of said nascent gas bubbles from said capillary openings in the gas diffusing surface solely by the action of the liquid moving in said partially developed laminar boundary layer and some of said nascent gas bubbles solely by the action of the liquid moving in said fully developed laminar boundary layer.

104. The method of claim 89 in which the farthest upstream of said capillary openings in the gas diffusing surface of said gas transmitting body lie immediately adjacent said leading edge of the gas diffusing surface.

105. The method of claim 89 in which the shearing liquid flows across said leading edge of the gas diffusing surface at a mean velocity of at least about 10 feet per second.

106. The method of claim 89 in which the shearing liquid flows across said leading edge of the gas diffusing surface at a mean velocity of at least about 15 feet per second.

107. The method of claim 89 in which the shearing liquid flows across said leading edge of the gas diffusing surface at a mean velocity of at least about 20 feet per second.

108. The method of claim 89 in which the shearing liquid flows across said leading edge of the gas diffusing surface at a mean velocity of at least about 25 feet per second.

109. The method of claim 89 in which gas is supplied to said gas transmitting passages at a rate to produce a gas flow through said passages of at least about 10 standard cubic feet per minute per square foot of active area in said gas diffusing surface.

110. The method of claim 89 in which gas is supplied to said gas transmitting passages at a rate to produce a gas flow through said passages of at least about 40 standard cubic feet per minute per square foot of active area in said gas diffusing surface.

111. The method of claim 89 in which gas is supplied to said gas transmitting passages at a rate to produce a gas flow through said passages of at least about 70 standard cubic feet per minute per square foot of active area in said gas diffusing surface.

112. The method of claim 89 in which the distance separating said leading edge of the gas diffusing surface from the farthest downstream of said capillary openings is no more than about 1 inch.

113. The method of claim 89 in which the distance separating said leading edge of the gas diffusing surface from the farthest downstream of said capillary openings is no more than about 0.5 inch.

114. The method of claim 89 in which the distance separating said leading edge of the gas diffusing surface from the farthest downstream of said capillary openings is no more than about 0.1 inch.

115. The method of claim 89 in which said gas diffusing surface is generally planar.

116. The method of claim 89 in which the material of which said gas diffusing surface is formed is selected from the group of materials having a contact angle with tap water of at least about 60°.

117. Bubble shearing apparatus for diffusing fine gas bubbles into a body of liquid which comprises:
a gas transmitting body having a plurality of gas transmitting passages extending therethrough, each of said passages terminating in a capillary opening at a gas diffusing surface of said body, substantially all said capillary openings having a diameter of no more than about 100 microns;
means for connecting said gas transmitting passages to a source of gas to provide a flow of gas through said passages and out said plurality of capillary openings to form nascent gas bubbles;
a slot-defining member spaced from said gas diffusing surface to form with said surface a shearing liquid transmiting slot having an inlet end, and a discharge end out of which shearing liquid may be discharged into said body of liquid, the shape, dimensions and spacing of said gas transmitting body and said slot-defining member being adapted, when water at 20° C. flowing through said slot with a mean entrance velocity of 10 feet per second is employed as the shearing liquid and no gas is flowing through said gas transmitting passages, to establish laminar flow in said water that is substantially parallel to the contour of said gas diffusing surface, including a partially developed laminar boundary layer immediately adjacent said gas diffusing surface with a free stream above said layer over at least a substantial portion of said capillary openings, the water over any remaining portion of said capillary openings being substantially free of any type of flow other than fully developed substantially parallel laminar flow; and means for connecting said slot with a source of liquid under pressure to provide a flow of liquid through the slot at a velocity to produce in water substantially parallel laminar flow as described above, to shear said nascent gas bubbles from said capillary openings as the liquid in said flow that is in contact with said gas diffusing surface moves past said openings, the flow of liquid through said slot carrying said sheared gas bubbles out of said slot at its discharge end and into said body of liquid.

118. The apparatus of claim 117 which is adapted to continue to produce substantially parallel laminar flow as described when said mean entrance water velocity is 15 feet per second.

119. The apparatus of claim 117 which is adapted to continue to produce substantially parallel laminar flow as described when said mean entrance water velocity is 20 feet per second.

120. The apparatus of claim 117 which is adapted to continue to produce substantially parallel laminar flow as described when said mean entrance water velocity is 25 feet per second.

121. Bubble shearing apparatus for diffusing fine gas bubbles into a body of liquid which comprises:
- a gas transmitting body having a plurality of gas transmitting passages extending therethrough, each of said passages terminating in a capillary opening at a gas diffusing surface of said body, substantially all said capillary openings having a diameter of no more than about 100 microns;
- means for connecting said gas transmitting passages to a source of gas to provide a flow of gas through said passages and out said plurality of capillary openings to form nascent gas bubbles;
- a slot-defining member spaced from said gas diffusing surface to form with said surface a shearing liquid transmitting slot having an inlet end, and a discharge end out of which shearing liquid may be discharged into said body of liquid, the product of (a) the distance separating said inlet end from the farthest downstream of all said capillary openings, times (b) the average width of said liquid transmitting slot throughout said distance being no more than about 0.1 square inches; and
- means for connecting said slot with a source of liquid under pressure to provide a flow of liquid through the slot to shear said nascent gas bubbles from said capillary openings as the liquid in said flow that is in contact with said gas diffusing surface moves past said openings, the flow of liquid through said slot carrying said sheared gas bubbles out of said slot at its discharge end and into said body of liquid.

122. The apparatus of claim 121 in which said product is no more than about 0.075 square inches.

123. The apparatus of claim 121 in which said product is no more than about 0.05 square inches.

124. The apparatus of claim 121 in which said product is no more than about 0.025 square inches.

125. The apparatus of claim 121 in which said product is no more than about 0.01 square inches.

126. The apparatus of claim 121 in which said product is no more than about 0.005 square inches.

127. The apparatus of claim 33 in which said plurality of gas transmitting passages is defined by a plurality of discrete tubes embedded in said gas transmitting body as a matrix.

* * * * *